(12) United States Patent
Iioka et al.

(10) Patent No.: US 6,943,814 B2
(45) Date of Patent: Sep. 13, 2005

(54) GRADATION DISPLAY METHOD

(75) Inventors: Mitsuru Iioka, Saitama (JP); Yoshiyuki Hirayama, Saitama (JP); Noribumi Sato, Saitama (JP); Takashi Nakajima, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 533 days.

(21) Appl. No.: 10/263,688

(22) Filed: Oct. 4, 2002

(65) Prior Publication Data

US 2003/0076517 A1 Apr. 24, 2003

(30) Foreign Application Priority Data

Oct. 11, 2001 (JP) .................................... P. 2001-314614

(51) Int. Cl.[7] ............................ B41J 2/52; H04N 1/405
(52) U.S. Cl. ...................................... 347/131; 358/3.13
(58) Field of Search ......................... 347/131; 358/3.01, 358/3.06, 3.13, 3.16–3.18, 3.23

(56) References Cited

U.S. PATENT DOCUMENTS 6,731,407 B1 * 5/2004 Hayama ..................... 358/3.2

FOREIGN PATENT DOCUMENTS

JP          7-105888 B2    11/1995
JP          8-156329        6/1996

* cited by examiner

*Primary Examiner*—Huan Tran
(74) *Attorney, Agent, or Firm*—Morgan, Lewis & Bockius LLP

(57) ABSTRACT

In a gradation display method, an image is divided into pixels having fine areas, this pixel is furthermore divided into very fine pixels (Si) having very fine areas, and then gradation is displayed based upon a ratio of a colored very fine pixel (Si) with respect to all of very fine pixels (Si) within a pixel. Also, the above-described colored very fine pixel (Si) is formed by both a first growth core which is formed by increasing the number of colored very fine pixels of a single cluster, and a second growth core which is formed by increasing the number of colored very fine pixels of another single cluster.

18 Claims, 27 Drawing Sheets

FIG.1A
EXAMPLE(4-TH GRADATION) OF SCREEN ANGLE OF 45 DEGREES
(BASIC MATRIX PATTERN 8×4)

FIG.1B
EXAMPLE(8-TH GRADATION) OF SCREEN ANGLE OF 45 DEGREES
(BASIC MATRIX PATTERN 8×4)

FIG.2A
EXAMPLE(12-TH GRADATION) OF SCREEN ANGLE OF 45 DEGREES
(BASIC MATRIX PATTERN 8×4)

FIG.2B
EXAMPLE(16-TH GRADATION) OF SCREEN ANGLE OF 45 DEGREES
(BASIC MATRIX PATTERN 8×4)

FIG.3A
EXAMPLE(20-TH GRADATION) OF SCREEN ANGLE OF 45 DEGREES
(BASIC MATRIX PATTERN 8×4)

FIG.3B
EXAMPLE(24-TH GRADATION) OF SCREEN ANGLE OF 45 DEGREES
(BASIC MATRIX PATTERN 8×4)

FIG.4A
EXAMPLE(28-TH GRADATION) OF SCREEN ANGLE OF 45 DEGREES
(BASIC MATRIX PATTERN 8×4)

FIG.4B
EXAMPLE(32-ND GRADATION) OF SCREEN ANGLE OF 45 DEGREES
(BASIC MATRIX PATTERN 8×4)

FIG.7

LUT(LOOKUP TABLE)

| INPUT DATA (DENSITY DATA) B' | | OUTPUT DATA (GRADATION DATA) B |
|---|---|---|
| 00000000(=0)~ | 00000111(=7) | 000000(=0) |
| 00001000(=8)~ | 00001111(=15) | 000001(=1) |
| 00010000(=16)~ | 00010111(=23) | 000010(=2) |
| 00011000(=24)~ | 00011111(=31) | 000011(=3) |
| 00100000(=32)~ | 00100111(=39) | 000100(=4) |
| 00101000(=40)~ | 00101111(=47) | 000101(=5) |
| 00110000(=48)~ | 00110111(=55) | 000110(=6) |
| 00111000(=56)~ | 00111111(=63) | 000111(=7) |
| 01000000(=64)~ | 01000111(=71) | 001000(=8) |
| 01001000(=72)~ | 01001111(=79) | 001001(=9) |
| 01010000(=80)~ | 01010111(=87) | 001010(=10) |
| 01011000(=88)~ | 01011111(=95) | 001011(=11) |
| 01100000(=96)~ | 01100111(=103) | 001100(=12) |
| 01101000(=104)~ | 01101111(=111) | 001101(=13) |
| 01110000(=112)~ | 01110111(=119) | 001110(=14) |
| 01111000(=120)~ | 01111111(=127) | 001111(=15) |
| 10000000(=128)~ | 10000111(=135) | 010000(=16) |
| 10001000(=136)~ | 10001111(=143) | 010001(=17) |
| 10010000(=144)~ | 10010111(=151) | 010010(=18) |
| 10011000(=152)~ | 10011111(=159) | 010011(=19) |
| 10100000(=160)~ | 10100111(=167) | 010100(=20) |
| 10101000(=168)~ | 10101111(=175) | 010101(=21) |
| 10110000(=176)~ | 10110111(=183) | 010110(=22) |
| 10111000(=184)~ | 10111111(=191) | 010111(=23) |
| 11000000(=192)~ | 11000111(=199) | 011000(=24) |
| 11001000(=200)~ | 11001111(=207) | 011001(=25) |
| 11010000(=208)~ | 11010111(=215) | 011010(=26) |
| 11011000(=216)~ | 11001111(=223) | 011011(=27) |
| 11100000(=224)~ | 11100111(=231) | 011100(=28) |
| 11101000(=232)~ | 11101111(=239) | 011101(=29) |
| 11110000(=240)~ | 11110111(=247) | 011110(=30) |
| 11111000(=248)~ | 11111110(=254) | 011111(=31) |
| 11111111(=255) | | 100000(=32) |

FIG.10

EXAMPLE OF RELATIONSHIP BETWEEN X ADDRESS AND Y ADDRESS IN CASE OF SCREEN ANGLE OF 45 DEGREES (BASIC MATRIX PATTERN 8×4)

| | | X | | | | | | | |
|---|---|---|---|---|---|---|---|---|---|
| | | 0000 | 0001 | 0010 | 0011 | 0100 | 0101 | 0110 | 0111 |
| Y | 0000 | S1 | S5 | S9 | S13 | S25 | S17 | S21 | S29 |
| | 0001 | S6 | S10 | S14 | S30 | S18 | S22 | S26 | S2 |
| | 0010 | S11 | S15 | S27 | S19 | S23 | S31 | S3 | S7 |
| | 0011 | S16 | S32 | S20 | S24 | S28 | S4 | S8 | S12 |

FIG.11

| X | Y | S | A |
|---|---|---|---|
| 0000 | 0000 | S1 | 000001 |
| 0001 | 0000 | S5 | 000101 |
| 0010 | 0000 | S9 | 001001 |
| 0011 | 0000 | S13 | 001101 |
| 0100 | 0000 | S25 | 011001 |
| 0101 | 0000 | S17 | 010001 |
| 0110 | 0000 | S21 | 010101 |
| 0111 | 0000 | S29 | 011101 |
| 0000 | 0001 | S6 | 000110 |
| 0001 | 0001 | S10 | 001010 |
| 0010 | 0001 | S14 | 001110 |
| 0011 | 0001 | S30 | 011110 |
| 0100 | 0001 | S18 | 010010 |
| 0101 | 0001 | S22 | 010110 |
| 0110 | 0001 | S26 | 011010 |
| 0111 | 0001 | S2 | 000010 |
| 0000 | 0010 | S11 | 001011 |
| 0001 | 0010 | S15 | 001111 |
| 0010 | 0010 | S27 | 011011 |
| 0011 | 0010 | S19 | 010011 |
| 0100 | 0010 | S23 | 010111 |
| 0101 | 0010 | S31 | 011111 |
| 0110 | 0010 | S3 | 000011 |
| 0111 | 0010 | S7 | 000111 |
| 0000 | 0011 | S16 | 010000 |
| 0001 | 0011 | S32 | 100000 |
| 0010 | 0011 | S20 | 010100 |
| 0011 | 0011 | S24 | 011000 |
| 0100 | 0011 | S28 | 011100 |
| 0101 | 0011 | S4 | 000100 |
| 0110 | 0011 | S8 | 001000 |
| 0111 | 0011 | S12 | 001100 |

FIG.12A
EXAMPLE(4-TH GRADATION) OF SCREEN ANGLE OF 45 DEGREES
(BASIC MATRIX PATTERN 8×4)

Si

| 1 | 5 | 9 | 14 | 29 | 13 | 21 | 28 | 1 | 5 | 9 | 14 | 29 | 13 | 21 | 28 | 1 | 5 | 9 | 14 |
|---|---|---|----|----|----|----|----|---|---|---|----|----|----|----|----|---|---|---|----|
| 6 | 10 | 16 | 30 | 15 | 23 | 26 | 2 | 6 | 10 | 16 | 30 | 15 | 23 | 26 | 2 | 6 | 10 | 16 | 30 |
| 11 | 18 | 31 | 17 | 25 | 24 | 3 | 7 | 11 | 18 | 31 | 17 | 25 | 24 | 3 | 7 | 11 | 18 | 31 | 17 |
| 20 | 32 | 19 | 27 | 22 | 4 | 8 | 12 | 20 | 32 | 19 | 27 | 22 | 4 | 8 | 12 | 20 | 32 | 19 | 27 |
| 29 | 13 | 21 | 28 | 1 | 5 | 9 | 14 | 29 | 13 | 21 | 28 | 1 | 5 | 9 | 14 | 29 | 13 | 21 | 28 |
| 15 | 23 | 26 | 2 | 6 | 10 | 16 | 30 | 15 | 23 | 26 | 2 | 6 | 10 | 16 | 30 | 15 | 23 | 26 | 2 |
| 25 | 24 | 3 | 7 | 11 | 18 | 31 | 17 | 25 | 24 | 3 | 7 | 11 | 18 | 31 | 17 | 25 | 24 | 3 | 7 |
| 22 | 4 | 8 | 12 | 20 | 32 | 19 | 27 | 22 | 4 | 8 | 12 | 20 | 32 | 19 | 27 | 22 | 4 | 8 | 12 |
| 1 | 5 | 9 | 14 | 29 | 13 | 21 | 28 | 1 | 5 | 9 | 14 | 29 | 13 | 21 | 28 | 1 | 5 | 9 | 14 |
| 6 | 10 | 16 | 30 | 15 | 23 | 26 | 2 | 6 | 10 | 16 | 30 | 15 | 23 | 26 | 2 | 6 | 10 | 16 | 30 |
| 6 | 10 | 16 | 30 | 15 | 23 | 26 | 2 | 6 | 10 | 16 | 30 | 15 | 23 | 26 | 2 | 6 | 10 | 16 | 30 |
| 11 | 18 | 31 | 17 | 25 | 24 | 3 | 7 | 11 | 18 | 31 | 17 | 25 | 24 | 3 | 7 | 11 | 18 | 31 | 17 |
| 20 | 32 | 19 | 27 | 22 | 4 | 8 | 12 | 20 | 32 | 19 | 27 | 22 | 4 | 8 | 12 | 20 | 32 | 19 | 27 |

FIG.12B
EXAMPLE(8-TH GRADATION) OF SCREEN ANGLE OF 45 DEGREES
(BASIC MATRIX PATTERN 8×4)

Si

| 1 | 5 | 9 | 14 | 29 | 13 | 21 | 28 | 1 | 5 | 9 | 14 | 29 | 13 | 21 | 28 | 1 | 5 | 9 | 14 |
|---|---|---|----|----|----|----|----|---|---|---|----|----|----|----|----|---|---|---|----|
| 6 | 10 | 16 | 30 | 15 | 23 | 26 | 2 | 6 | 10 | 16 | 30 | 15 | 23 | 26 | 2 | 6 | 10 | 16 | 30 |
| 11 | 18 | 31 | 17 | 25 | 24 | 3 | 7 | 11 | 18 | 31 | 17 | 25 | 24 | 3 | 7 | 11 | 18 | 31 | 17 |
| 20 | 32 | 19 | 27 | 22 | 4 | 8 | 12 | 20 | 32 | 19 | 27 | 22 | 4 | 8 | 12 | 20 | 32 | 19 | 27 |
| 29 | 13 | 21 | 28 | 1 | 5 | 9 | 14 | 29 | 13 | 21 | 28 | 1 | 5 | 9 | 14 | 29 | 13 | 21 | 28 |
| 15 | 23 | 26 | 2 | 6 | 10 | 16 | 30 | 15 | 23 | 26 | 2 | 6 | 10 | 16 | 30 | 15 | 23 | 26 | 2 |
| 25 | 24 | 3 | 7 | 11 | 18 | 31 | 17 | 25 | 24 | 3 | 7 | 11 | 18 | 31 | 17 | 25 | 24 | 3 | 7 |
| 22 | 4 | 8 | 12 | 20 | 32 | 19 | 27 | 22 | 4 | 8 | 12 | 20 | 32 | 19 | 27 | 22 | 4 | 8 | 12 |
| 1 | 5 | 9 | 14 | 29 | 13 | 21 | 28 | 1 | 5 | 9 | 14 | 29 | 13 | 21 | 28 | 1 | 5 | 9 | 14 |
| 6 | 10 | 16 | 30 | 15 | 23 | 26 | 2 | 6 | 10 | 16 | 30 | 15 | 23 | 26 | 2 | 6 | 10 | 16 | 30 |
| 11 | 18 | 31 | 17 | 25 | 24 | 3 | 7 | 11 | 18 | 31 | 17 | 25 | 24 | 3 | 7 | 11 | 18 | 31 | 17 |
| 20 | 32 | 19 | 27 | 22 | 4 | 8 | 12 | 20 | 32 | 19 | 27 | 22 | 4 | 8 | 12 | 20 | 32 | 19 | 27 |

FIG.13A
EXAMPLE(12-TH GRADATION) OF SCREEN ANGLE OF 45 DEGREES
(BASIC MATRIX PATTERN 8×4)

Si

FIG.13B
EXAMPLE(16-TH GRADATION) OF SCREEN ANGLE OF 45 DEGREES
(BASIC MATRIX PATTERN 8×4)

Si

FIG.14A
EXAMPLE(20-TH GRADATION) OF SCREEN ANGLE OF 45 DEGREES
(BASIC MATRIX PATTERN 8×4)

FIG.14B
EXAMPLE(24-TH GRADATION) OF SCREEN ANGLE OF 45 DEGREES
(BASIC MATRIX PATTERN 8×4)

FIG.15A
EXAMPLE(28-TH GRADATION) OF SCREEN ANGLE OF 45 DEGREES
(BASIC MATRIX PATTERN 8×4)

FIG.15B
EXAMPLE(32-ND GRADATION) OF SCREEN ANGLE OF 45 DEGREES
(BASIC MATRIX PATTERN 8×4)

FIG.16
EXAMPLE(ZEROTH GRADATION) OF SCREEN ANGLE OF 90 DEGREES
(BASIC MATRIX PATTERN 6×6)

Si

| 1 | 7 | 13 | 25 | 19 | 31 | 1 | 7 | 13 | 25 | 19 | 31 | 1 | 7 | 13 | 25 | 19 | 31 |
|---|---|---|---|---|---|---|---|---|---|---|---|---|---|---|---|---|---|
| 2 | 8 | 14 | 32 | 20 | 26 | 2 | 8 | 14 | 32 | 20 | 26 | 2 | 8 | 14 | 32 | 20 | 26 |
| 3 | 9 | 15 | 27 | 21 | 33 | 3 | 9 | 15 | 27 | 21 | 33 | 3 | 9 | 15 | 27 | 21 | 33 |
| 4 | 10 | 16 | 34 | 22 | 28 | 4 | 10 | 16 | 34 | 22 | 28 | 4 | 10 | 16 | 34 | 22 | 28 |
| 5 | 11 | 17 | 29 | 23 | 35 | 5 | 11 | 17 | 29 | 23 | 35 | 5 | 11 | 17 | 29 | 23 | 35 |
| 6 | 12 | 18 | 36 | 24 | 30 | 6 | 12 | 18 | 36 | 24 | 30 | 6 | 12 | 18 | 36 | 24 | 30 |
| 1 | 7 | 13 | 25 | 19 | 31 | 1 | 7 | 13 | 25 | 19 | 31 | 1 | 7 | 13 | 25 | 19 | 31 |
| 2 | 8 | 14 | 32 | 20 | 26 | 2 | 8 | 14 | 32 | 20 | 26 | 2 | 8 | 14 | 32 | 20 | 26 |
| 3 | 9 | 15 | 27 | 21 | 33 | 3 | 9 | 15 | 27 | 21 | 33 | 3 | 9 | 15 | 27 | 21 | 33 |
| 4 | 10 | 16 | 34 | 22 | 28 | 4 | 10 | 16 | 34 | 22 | 28 | 4 | 10 | 16 | 34 | 22 | 28 |
| 5 | 11 | 17 | 29 | 23 | 35 | 5 | 11 | 17 | 29 | 23 | 35 | 5 | 11 | 17 | 29 | 23 | 35 |
| 6 | 12 | 18 | 36 | 24 | 30 | 6 | 12 | 18 | 36 | 24 | 30 | 6 | 12 | 18 | 36 | 24 | 30 |

FIG.17
EXAMPLE(ZEROTH GRADATION) OF SCREEN ANGLE OF 90 DEGREES
(BASIC MATRIX PATTERN 6×6)

Si

| 1 | 7 | 14 | 25 | 13 | 31 | 1 | 7 | 14 | 25 | 13 | 31 | 1 | 7 | 14 | 25 | 13 | 31 |
|---|---|---|---|---|---|---|---|---|---|---|---|---|---|---|---|---|---|
| 2 | 8 | 16 | 32 | 15 | 26 | 2 | 8 | 16 | 32 | 15 | 26 | 2 | 8 | 16 | 32 | 15 | 26 |
| 3 | 9 | 18 | 27 | 17 | 33 | 3 | 9 | 18 | 27 | 17 | 33 | 3 | 9 | 18 | 27 | 17 | 33 |
| 4 | 10 | 20 | 34 | 19 | 28 | 4 | 10 | 20 | 34 | 19 | 28 | 4 | 10 | 20 | 34 | 19 | 28 |
| 5 | 11 | 22 | 29 | 21 | 35 | 5 | 11 | 22 | 29 | 21 | 35 | 5 | 11 | 22 | 29 | 21 | 35 |
| 6 | 12 | 24 | 36 | 23 | 30 | 6 | 12 | 24 | 36 | 23 | 30 | 6 | 12 | 24 | 36 | 23 | 30 |
| 1 | 7 | 14 | 25 | 13 | 31 | 1 | 7 | 14 | 25 | 13 | 31 | 1 | 7 | 14 | 25 | 13 | 31 |
| 2 | 8 | 16 | 32 | 15 | 26 | 2 | 8 | 16 | 32 | 15 | 26 | 2 | 8 | 16 | 32 | 15 | 26 |
| 3 | 9 | 18 | 27 | 17 | 33 | 3 | 9 | 18 | 27 | 17 | 33 | 3 | 9 | 18 | 27 | 17 | 33 |
| 4 | 10 | 20 | 34 | 19 | 28 | 4 | 10 | 20 | 34 | 19 | 28 | 4 | 10 | 20 | 34 | 19 | 28 |
| 5 | 11 | 22 | 29 | 21 | 35 | 5 | 11 | 22 | 29 | 21 | 35 | 5 | 11 | 22 | 29 | 21 | 35 |
| 6 | 12 | 24 | 36 | 23 | 30 | 6 | 12 | 24 | 36 | 23 | 30 | 6 | 12 | 24 | 36 | 23 | 30 |

FIG.18
EXAMPLE(ZEROTH GRADATION) OF SCREEN ANGLE OF 27 DEGREES
(BASIC MATRIX PATTERN 10×2)

Si

| 1 | 3 | 5 | 7 | 9 | 17 | 15 | 11 | 14 | 19 | 1 | 3 | 5 | 7 | 9 | 17 | 15 | 11 | 14 | 19 | 1 | 3 |
|---|---|---|---|---|---|---|---|---|---|---|---|---|---|---|---|---|---|---|---|---|---|
| 6 | 8 | 10 | 18 | 16 | 12 | 13 | 20 | 2 | 4 | 6 | 8 | 10 | 18 | 16 | 12 | 13 | 20 | 2 | 4 | 6 | 8 |
| 9 | 17 | 15 | 11 | 14 | 19 | 1 | 3 | 5 | 7 | 9 | 17 | 15 | 11 | 14 | 19 | 1 | 3 | 5 | 7 | 9 | 17 |
| 16 | 12 | 13 | 20 | 2 | 4 | 6 | 8 | 10 | 18 | 16 | 12 | 13 | 20 | 2 | 4 | 6 | 8 | 10 | 18 | 16 | 12 |
| 14 | 19 | 1 | 3 | 5 | 7 | 9 | 17 | 15 | 11 | 14 | 19 | 1 | 3 | 5 | 7 | 9 | 17 | 15 | 11 | 14 | 19 |
| 2 | 4 | 6 | 8 | 10 | 18 | 16 | 12 | 13 | 20 | 2 | 4 | 6 | 8 | 10 | 18 | 16 | 12 | 13 | 20 | 2 | 4 |
| 5 | 7 | 9 | 17 | 15 | 11 | 14 | 19 | 1 | 3 | 5 | 7 | 9 | 17 | 15 | 11 | 14 | 19 | 1 | 3 | 5 | 7 |
| 10 | 18 | 16 | 12 | 13 | 20 | 2 | 4 | 6 | 8 | 10 | 18 | 16 | 12 | 13 | 20 | 2 | 4 | 6 | 8 | 10 | 18 |
| 15 | 11 | 14 | 19 | 1 | 3 | 5 | 7 | 9 | 17 | 15 | 11 | 14 | 19 | 1 | 3 | 5 | 7 | 9 | 17 | 15 | 11 |
| 13 | 20 | 2 | 4 | 6 | 8 | 10 | 18 | 16 | 12 | 13 | 20 | 2 | 4 | 6 | 8 | 10 | 18 | 16 | 12 | 13 | 20 |
| 1 | 3 | 5 | 7 | 9 | 17 | 15 | 11 | 14 | 19 | 1 | 3 | 5 | 7 | 9 | 17 | 15 | 11 | 14 | 19 | 1 | 3 |
| 6 | 8 | 10 | 18 | 16 | 12 | 13 | 20 | 2 | 4 | 6 | 8 | 10 | 18 | 16 | 12 | 13 | 20 | 2 | 4 | 6 | 8 |

FIG.19
EXAMPLE(ZEROTH GRADATION) OF SCREEN ANGLE OF 27 DEGREES
(BASIC MATRIX PATTERN 10×2)

Si

| 1 | 3 | 5 | 8 | 12 | 17 | 7 | 13 | 16 | 19 | 1 | 3 | 5 | 8 | 12 | 17 | 7 | 13 | 16 | 19 | 1 | 3 |
|---|---|---|---|---|---|---|---|---|---|---|---|---|---|---|---|---|---|---|---|---|---|
| 6 | 10 | 14 | 18 | 9 | 11 | 15 | 20 | 2 | 4 | 6 | 10 | 14 | 18 | 9 | 11 | 15 | 20 | 2 | 4 | 6 | 10 |
| 12 | 17 | 7 | 13 | 16 | 19 | 1 | 3 | 5 | 8 | 12 | 17 | 7 | 13 | 16 | 19 | 1 | 3 | 5 | 8 | 12 | 17 |
| 9 | 11 | 15 | 20 | 2 | 4 | 6 | 10 | 14 | 18 | 9 | 11 | 15 | 20 | 2 | 4 | 6 | 10 | 14 | 18 | 9 | 11 |
| 16 | 19 | 1 | 3 | 5 | 8 | 12 | 17 | 7 | 13 | 16 | 19 | 1 | 3 | 5 | 8 | 12 | 17 | 7 | 13 | 16 | 19 |
| 2 | 4 | 6 | 10 | 14 | 18 | 9 | 11 | 15 | 20 | 2 | 4 | 6 | 10 | 14 | 18 | 9 | 11 | 15 | 20 | 2 | 4 |
| 5 | 8 | 12 | 17 | 7 | 13 | 16 | 19 | 1 | 3 | 5 | 8 | 12 | 17 | 7 | 13 | 16 | 19 | 1 | 3 | 5 | 8 |
| 14 | 18 | 9 | 11 | 15 | 20 | 2 | 4 | 6 | 10 | 14 | 18 | 9 | 11 | 15 | 20 | 2 | 4 | 6 | 10 | 14 | 18 |
| 7 | 13 | 16 | 19 | 1 | 3 | 5 | 8 | 12 | 17 | 7 | 13 | 16 | 19 | 1 | 3 | 5 | 8 | 12 | 17 | 7 | 13 |
| 15 | 20 | 2 | 4 | 6 | 10 | 14 | 18 | 9 | 11 | 15 | 20 | 2 | 4 | 6 | 10 | 14 | 18 | 9 | 11 | 15 | 20 |
| 1 | 3 | 5 | 8 | 12 | 17 | 7 | 13 | 16 | 19 | 1 | 3 | 5 | 8 | 12 | 17 | 7 | 13 | 16 | 19 | 1 | 3 |
| 6 | 10 | 14 | 18 | 9 | 11 | 15 | 20 | 2 | 4 | 6 | 10 | 14 | 18 | 9 | 11 | 15 | 20 | 2 | 4 | 6 | 10 |

FIG.20
PIXELS CONSTITUTED BY VERY VERY FINE PIXELS Si (i=1 TO 128)

| 122 | 8 | 31 | 63 |
|---|---|---|---|
| 114 | 7 | 27 | 55 |
| 106 | 6 | 23 | 47 |
| 98 | 5 | 19 | 39 |
| 90 | 124 | 12 | 32 |
| 82 | 116 | 11 | 28 |
| 74 | 108 | 10 | 24 |
| 66 | 100 | 9 | 20 |
| 58 | 92 | 126 | 16 |
| 50 | 84 | 118 | 15 |
| 42 | 76 | 110 | 14 |
| 34 | 68 | 102 | 13 |
| 121 | 60 | 94 | 128 |
| 113 | 52 | 86 | 120 |
| 105 | 44 | 78 | 112 |
| 97 | 36 | 70 | 104 |
| 89 | 123 | 62 | 96 |
| 81 | 115 | 54 | 88 |
| 73 | 107 | 46 | 80 |
| 65 | 99 | 38 | 72 |
| 57 | 91 | 125 | 64 |
| 49 | 83 | 117 | 56 |
| 41 | 75 | 109 | 48 |
| 33 | 67 | 101 | 40 |
| 29 | 59 | 93 | 127 |
| 25 | 51 | 85 | 119 |
| 21 | 43 | 77 | 111 |
| 17 | 35 | 69 | 103 |
| 4 | 30 | 61 | 95 |
| 3 | 26 | 53 | 87 |
| 2 | 22 | 45 | 79 |
| 1 | 18 | 37 | 71 |

32ND GRADATION

| 122 | 8 | 31 | 63 | 89 | 123 |
|---|---|---|---|---|---|
| 114 | 7 | 27 | 55 | 81 | 115 |
| 106 | 6 | 23 | 47 | 73 | 107 |
| 98 | 5 | 19 | 39 | 65 | 99 |
| 90 | 124 | 12 | 32 | 57 | 91 |
| 82 | 116 | 11 | 28 | 49 | 83 |
| 74 | 108 | 10 | 24 | 41 | 75 |
| 66 | 100 | 9 | 20 | 33 | 67 |
| 58 | 92 | 126 | 16 | 29 | 59 |
| 50 | 84 | 118 | 15 | 25 | 51 |
| 42 | 76 | 110 | 14 | 21 | 43 |
| 34 | 68 | 102 | 13 | 17 | 35 |
| 121 | 60 | 94 | 128 | 4 | 30 |
| 113 | 52 | 86 | 120 | 3 | 26 |
| 105 | 44 | 78 | 112 | 2 | 22 |
| 97 | 36 | 70 | 104 | 1 | 18 |
| 89 | 123 | 62 | 96 | 122 | 8 |
| 81 | 115 | 54 | 88 | 114 | 7 |
| 73 | 107 | 46 | 80 | 106 | 6 |
| 65 | 99 | 38 | 72 | 98 | 5 |
| 57 | 91 | 125 | 64 | 90 | 124 |
| 49 | 83 | 117 | 56 | 82 | 116 |
| 41 | 75 | 109 | 48 | 74 | 108 |
| 33 | 67 | 101 | 40 | 66 | 100 |
| 29 | 59 | 93 | 127 | 58 | 92 |
| 25 | 51 | 85 | 119 | 50 | 84 |
| 21 | 43 | 77 | 111 | 42 | 76 |
| 17 | 35 | 69 | 103 | 34 | 68 |
| 4 | 30 | 61 | 95 | 121 | 60 |
| 3 | 26 | 53 | 87 | 113 | 52 |
| 2 | 22 | 45 | 79 | 105 | 44 |
| 1 | 18 | 37 | 71 | 97 | 36 |

Si

FIG.22
40TH GRADATION

| | | | | | |
|---|---|---|---|---|---|
| 122 | 8 | 31 | 63 | 89 | 123 |
| 114 | 7 | 27 | 55 | 81 | 115 |
| 106 | 6 | 23 | 47 | 73 | 107 |
| 98 | 5 | 19 | 39 | 65 | 99 |
| 90 | 124 | 12 | 32 | 57 | 91 |
| 82 | 116 | 11 | 28 | 49 | 83 |
| 74 | 108 | 10 | 24 | 41 | 75 |
| 66 | 100 | 9 | 20 | 33 | 67 |
| 58 | 92 | 126 | 16 | 29 | 59 |
| 50 | 84 | 118 | 15 | 25 | 51 |
| 42 | 76 | 110 | 14 | 21 | 43 |
| 34 | 68 | 102 | 13 | 17 | 35 |
| 121 | 60 | 94 | 128 | 4 | 30 |
| 113 | 52 | 86 | 120 | 3 | 26 |
| 105 | 44 | 78 | 112 | 2 | 22 |
| 97 | 36 | 70 | 104 | 1 | 18 |
| 89 | 123 | 62 | 96 | 122 | 8 |
| 81 | 115 | 54 | 88 | 114 | 7 |
| 73 | 107 | 46 | 80 | 106 | 6 |
| 65 | 99 | 38 | 72 | 98 | 5 |
| 57 | 91 | 125 | 64 | 90 | 124 |
| 49 | 83 | 117 | 56 | 82 | 116 |
| 41 | 75 | 109 | 48 | 74 | 108 |
| 33 | 67 | 101 | 40 | 66 | 100 |
| 29 | 59 | 93 | 127 | 58 | 92 |
| 25 | 51 | 85 | 119 | 50 | 84 |
| 21 | 43 | 77 | 111 | 42 | 76 |
| 17 | 35 | 69 | 103 | 34 | 68 |
| 4 | 30 | 61 | 95 | 121 | 60 |
| 3 | 26 | 53 | 87 | 113 | 52 |
| 2 | 22 | 45 | 79 | 105 | 44 |
| 1 | 18 | 37 | 71 | 97 | 36 |

56th GRADATION

| 122 | 8 | 31 | 63 | 89 | 123 |
|-----|-----|-----|-----|-----|-----|
| 114 | 7 | 27 | 55 | 81 | 115 |
| 106 | 6 | 23 | 47 | 73 | 107 |
| 98 | 5 | 19 | 39 | 65 | 99 |
| 90 | 124 | 12 | 32 | 57 | 91 |
| 82 | 116 | 11 | 28 | 49 | 83 |
| 74 | 108 | 10 | 24 | 41 | 75 |
| 66 | 100 | 9 | 20 | 33 | 67 |
| 58 | 92 | 126 | 16 | 29 | 59 |
| 50 | 84 | 118 | 15 | 25 | 51 |
| 42 | 76 | 110 | 14 | 21 | 43 |
| 34 | 68 | 102 | 13 | 17 | 35 |
| 121 | 60 | 94 | 128 | 4 | 30 |
| 113 | 52 | 86 | 120 | 3 | 26 |
| 105 | 44 | 78 | 112 | 2 | 22 |
| 97 | 36 | 70 | 104 | 1 | 18 |
| 89 | 123 | 62 | 96 | 122 | 8 |
| 81 | 115 | 54 | 88 | 114 | 7 |
| 73 | 107 | 46 | 80 | 106 | 6 |
| 65 | 99 | 38 | 72 | 98 | 5 |
| 57 | 91 | 125 | 64 | 90 | 124 |
| 49 | 83 | 117 | 56 | 82 | 116 |
| 41 | 75 | 109 | 48 | 74 | 108 |
| 33 | 67 | 101 | 40 | 66 | 100 |
| 29 | 59 | 93 | 127 | 58 | 92 |
| 25 | 51 | 85 | 119 | 50 | 84 |
| 21 | 43 | 77 | 111 | 42 | 76 |
| 17 | 35 | 69 | 103 | 34 | 68 |
| 4 | 30 | 61 | 95 | 121 | 60 |
| 3 | 26 | 53 | 87 | 113 | 52 |
| 2 | 22 | 45 | 79 | 105 | 44 |
| 1 | 18 | 37 | 71 | 97 | 36 |

64TH GRADATION

| | | | | | |
|---|---|---|---|---|---|
| 122 | 8 | 31 | 63 | 89 | 123 |
| 114 | 7 | 27 | 55 | 81 | 115 |
| 106 | 6 | 23 | 47 | 73 | 107 |
| 98 | 5 | 19 | 39 | 65 | 99 |
| 90 | 124 | 12 | 32 | 57 | 91 |
| 82 | 116 | 11 | 28 | 49 | 83 |
| 74 | 108 | 10 | 24 | 41 | 75 |
| 66 | 100 | 9 | 20 | 33 | 67 |
| 58 | 92 | 126 | 16 | 29 | 59 |
| 50 | 84 | 118 | 15 | 25 | 51 |
| 42 | 76 | 110 | 14 | 21 | 43 |
| 34 | 68 | 102 | 13 | 17 | 35 |
| 121 | 60 | 94 | 128 | 4 | 30 |
| 113 | 52 | 86 | 120 | 3 | 26 |
| 105 | 44 | 78 | 112 | 2 | 22 |
| 97 | 36 | 70 | 104 | 1 | 18 |
| 89 | 123 | 62 | 96 | 122 | 8 |
| 81 | 115 | 54 | 88 | 114 | 7 |
| 73 | 107 | 46 | 80 | 106 | 6 |
| 65 | 99 | 38 | 72 | 98 | 5 |
| 57 | 91 | 125 | 64 | 90 | 124 |
| 49 | 83 | 117 | 56 | 82 | 116 |
| 41 | 75 | 109 | 48 | 74 | 108 |
| 33 | 67 | 101 | 40 | 66 | 100 |
| 29 | 59 | 93 | 127 | 58 | 92 |
| 25 | 51 | 85 | 119 | 50 | 84 |
| 21 | 43 | 77 | 111 | 42 | 76 |
| 17 | 35 | 69 | 103 | 34 | 68 |
| 4 | 30 | 61 | 95 | 121 | 60 |
| 3 | 26 | 53 | 87 | 113 | 52 |
| 2 | 22 | 45 | 79 | 105 | 44 |
| 1 | 18 | 37 | 71 | 97 | 36 |

Si

FIG.25
80TH GRADATION

| 122 | 8 | 31 | 63 | 89 | 123 |
|---|---|---|---|---|---|
| 114 | 7 | 27 | 55 | 81 | 115 |
| 106 | 6 | 23 | 47 | 73 | 107 |
| 98 | 5 | 19 | 39 | 65 | 99 |
| 90 | 124 | 12 | 32 | 57 | 91 |
| 82 | 116 | 11 | 28 | 49 | 83 |
| 74 | 108 | 10 | 24 | 41 | 75 |
| 66 | 100 | 9 | 20 | 33 | 67 |
| 58 | 92 | 126 | 16 | 29 | 59 |
| 50 | 84 | 118 | 15 | 25 | 51 |
| 42 | 76 | 110 | 14 | 21 | 43 |
| 34 | 68 | 102 | 13 | 17 | 35 |
| 121 | 60 | 94 | 128 | 4 | 30 |
| 113 | 52 | 86 | 120 | 3 | 26 |
| 105 | 44 | 78 | 112 | 2 | 22 |
| 97 | 36 | 70 | 104 | 1 | 18 |
| 89 | 123 | 62 | 96 | 122 | 8 |
| 81 | 115 | 54 | 88 | 114 | 7 |
| 73 | 107 | 46 | 80 | 106 | 6 |
| 65 | 99 | 38 | 72 | 98 | 5 |
| 57 | 91 | 125 | 64 | 90 | 124 |
| 49 | 83 | 117 | 56 | 82 | 116 |
| 41 | 75 | 109 | 48 | 74 | 108 |
| 33 | 67 | 101 | 40 | 66 | 100 |
| 29 | 59 | 93 | 127 | 58 | 92 |
| 25 | 51 | 85 | 119 | 50 | 84 |
| 21 | 43 | 77 | 111 | 42 | 76 |
| 17 | 35 | 69 | 103 | 34 | 68 |
| 4 | 30 | 61 | 95 | 121 | 60 |
| 3 | 26 | 53 | 87 | 113 | 52 |
| 2 | 22 | 45 | 79 | 105 | 44 |
| 1 | 18 | 37 | 71 | 97 | 36 |

Si

FIG.26
96TH GRADATION

| | | | | | |
|---|---|---|---|---|---|
| 122 | 8 | 31 | 63 | 89 | 123 |
| 114 | 7 | 27 | 55 | 81 | 115 |
| 106 | 6 | 23 | 47 | 73 | 107 |
| 98 | 5 | 19 | 39 | 65 | 99 |
| 90 | 124 | 12 | 32 | 57 | 91 |
| 82 | 116 | 11 | 28 | 49 | 83 |
| 74 | 108 | 10 | 24 | 41 | 75 |
| 66 | 100 | 9 | 20 | 33 | 67 |
| 58 | 92 | 126 | 16 | 29 | 59 |
| 50 | 84 | 118 | 15 | 25 | 51 |
| 42 | 76 | 110 | 14 | 21 | 43 |
| 34 | 68 | 102 | 13 | 17 | 35 |
| 121 | 60 | 94 | 128 | 4 | 30 |
| 113 | 52 | 86 | 120 | 3 | 26 |
| 105 | 44 | 78 | 112 | 2 | 22 |
| 97 | 36 | 70 | 104 | 1 | 18 |
| 89 | 123 | 62 | 96 | 122 | 8 |
| 81 | 115 | 54 | 88 | 114 | 7 |
| 73 | 107 | 46 | 80 | 106 | 6 |
| 65 | 99 | 38 | 72 | 98 | 5 |
| 57 | 91 | 125 | 64 | 90 | 124 |
| 49 | 83 | 117 | 56 | 82 | 116 |
| 41 | 75 | 109 | 48 | 74 | 108 |
| 33 | 67 | 101 | 40 | 66 | 100 |
| 29 | 59 | 93 | 127 | 58 | 92 |
| 25 | 51 | 85 | 119 | 50 | 84 |
| 21 | 43 | 77 | 111 | 42 | 76 |
| 17 | 35 | 69 | 103 | 34 | 68 |
| 4 | 30 | 61 | 95 | 121 | 60 |
| 3 | 26 | 53 | 87 | 113 | 52 |
| 2 | 22 | 45 | 79 | 105 | 44 |
| 1 | 18 | 37 | 71 | 97 | 36 |

Si

FIG.27A
PRIOR ART(4-TH GRADATION) OF SCREEN ANGLE OF 45 DEGREES
(BASIC MATRIX PATTERN 8×4)

FIG.27B
PRIOR ART(8-TH GRADATION) OF SCREEN ANGLE OF 45 DEGREES
(BASIC MATRIX PATTERN 8×4)

FIG.28A
PRIOR ART(12-TH GRADATION) OF SCREEN ANGLE OF 45 DEGREES
(BASIC MATRIX PATTERN 8×4)

FIG.28B
PRIOR ART(16-TH GRADATION) OF SCREEN ANGLE OF 45 DEGREES
(BASIC MATRIX PATTERN 8×4)

FIG.29A
PRIOR ART(20-TH GRADATION) OF SCREEN ANGLE OF 45 DEGREES
(BASIC MATRIX PATTERN 8×4)

FIG.29B
PRIOR ART(24-TH GRADATION) OF SCREEN ANGLE OF 45 DEGREES
(BASIC MATRIX PATTERN 8×4)

FIG.30A
PRIOR ART(28-TH GRADATION) OF SCREEN ANGLE OF 45 DEGREES
(BASIC MATRIX PATTERN 8×4)

FIG.30B
PRIOR ART(32-ND GRADATION) OF SCREEN ANGLE OF 45 DEGREES
(BASIC MATRIX PATTERN 8×4)

GRADATION DISPLAY METHOD

The present disclosure relates to the subject matter contained in Japanese Patent Application No.2001-314614 filed on Oct. 11, 2001, which are incorporated herein by reference in its entirety.

BACKGROUND OF THE INVENTION

1. Field of the Invention

The present invention is related to a gradation display method in an image output-apparatus. More specifically, the present invention is directed to a gradation display method by that an image to be displayed is divided into pixels having fine areas, and this pixel is furthermore divided into very fine pixels having very fine areas, and then, gradation is represented based upon a ratio of a colored area of a colored very fine pixel with respect to areas of all very fine pixels within the above-described pixel.

2. Description of the Related Art

Conventionally, when images having gradation are displayed in image output apparatus such as printing machines, printers, and digital type copying machines, such methods for displaying the gradation in a quasi-gradation display manner have been employed.

In the above-described quasi-gradation display method, gradation is displayed, or represented in such a manner that an image is divided into fine unit pixels, variable density is resembled in a continuous tone based upon large/small areas occupied by colored very fine elements among very fine pixels (for instance, either points or lines) within this unit pixel.

Then, such methods have been employed many times by which the gradation is displayed by large/small mesh points which are formed by the colored very fine elements within the unit pixel.

As the above-described method using the mesh point, a density pattern method (namely, area gradation method) is known. This density pattern method corresponds to such a method that while one pixel on the display side (on the side of image output apparatus) corresponding to one pixel of an original image is divided into a plurality of very fine pixels, a predetermined number of very fine pixels corresponding to gradation of the pixel are selected from a plurality of very fine pixels, and these selected very fine pixels are colored by using a predetermined color (for example, black). In this method, mesh points are formed from a predetermined number of colored very fine pixels corresponding to the above-described gradation.

In the above-described density pattern method, gradation having plural stages in response to the total number of very fine pixels which constitute one pixel on the above-described display side can be displayed.

FIG. 27 is an explanatory diagram for explaining prior art as to colored very fine pixels in the case that while a total number of very fine pixel "Si" which constitute the above-explained one pixel "S" is defined as 4×8=32, a binary display is performed based upon the respective very fine pixels Si (i=1 to 32). FIG. 27A is an explanatory diagram for indicating fourth gradation of colored very fine pixels S1 to S4. FIG. 27B is an explanatory diagram for showing eighth gradation of colored very fine pixels S1 to S8.

FIG. 27A to FIG. 30B are explanatory diagrams for explaining 12th gradation of colored very fine pixels S1 to S12; 16th gradation of colored very fine pixels S1 to S16; 20th gradation of colored very fine pixels S1 to S20; 28th gradation of colored very fine pixels S1 to S28; and 32-nd gradation of colored very fine pixels S1 to S32, respectively.

As a pixel "S" shown in FIG. 27 to FIG. 30B, a screen angle (namely, screen angle of colored very fine pixels) "θ" with respect to a horizontal line direction is equal to 45 degrees, and this screen angle "θ" corresponds to a straight line which connects centers of the above-described pixels "S".

Then, a growth direction (increasing direction of colored very fine pixels, namely, a growth direction of growth core) as to the first gradation to the 32-nd gradation of colored very fine pixels is set to the same direction as the screen angle.

The pixels "S" indicated in FIG. 27 to FIG. 30B are line growth type pixels, and thus, the colored very fine pixels are grown along the screen angle.

When an image is formed, in the case that the above-described gradation is displayed with respect to narrow lines, characters, and the like, these narrow lines/characters are easily blurred, and/or broken. In particular; this problem may readily become conspicuous at a screen angle, and at a line at an angle approximated to the screen angle. As a method of avoiding this problem, the below-mentioned methods (J01) to (J03) are known in this field.

The method capable of increasing the screen line number (J01):

In this method (J01), the above-described problem can be improved, but IOT defects (noise emphasis, uniformity within plane of density) are deteriorated as a secondary failure.

The technique described in JP-B-7-105888 (J02):

This conventional technique described in this publication may avoid a blurring phenomenon of lines and a broken phenomenon of lines by such a manner that a narrow line is recognized, this recognized narrow line is subdivided into very small blocks, and then, mesh point shapes (screen patterns) are produced which are different from each other every very small block.

However, in this conventional technique (J02), the process operation becomes complex, and thus, the manufacturing cost of the process circuit is increased. Also, the data processing amount is considerably large, and thus, the processing speed is lowered.

The conventional technique described in JP-A-8-156329:

In this technique described in this patent application, an identification is made of as to whether an image signal corresponds to a line image or a natural image. Based upon an identification result, two sets, or more sets of density signal converting means are switched.

In accordance with this technique (J03), the identifying means for identifying the image signal corresponds to the line image, or the natural image, and also, two sets, or more sets of density signal converting means are required, resulting in higher cost.

SUMMARY OF THE INVENTION

The present invention has been made to solve the above-described problems, and therefore, has an object to provide such a technical aspect capable of achieving the below-mentioned contents.

(001): An occurrence of blurring/broken phenomena of a narrow line along a screen angle of a pixel can be prevented by a simple method.

Next, the present invention will now be described so as to achieve the above-described technical aspect. It should be understood that elements of the present invention are attached symbols/numerals of elements of embodiments surrounded by blankets, in order to easily indicate a correspondence relationship with respect to elements described in the below-mentioned embodiments.

It should also be noted that the reason why the elements of the present invention are explained in correspondence with symbols/numerals of the below-mentioned embodiments is to easily understand the idea of the present invention, but is not to limit the technical scope of the present invention to these embodiments.

To solve the above-described problem, according to a first aspect of the invention, a gradation display method includes the steps of dividing an image into a plurality of pixels having fine areas, dividing each of fine pixels into very fine pixels (Si) having very fine areas, and displaying gradation based on a ratio of area of colored very fine pixels (Si) to that of all very fine pixels (Si) within each of pixels. The colored very fine pixel (Si) formed of a first growth core and a second growth core. The first growth core is formed by increasing number of colored very fine pixels of a single cluster. The second growth core is formed by increasing number of colored very fine pixels of another single cluster.

In the gradation display method of the present invention equipped with the above-described arrangement, since the colored very fine pixel is formed by both the first growth core which is formed by increasing the number of colored very fine pixels of the single cluster, and the second growth core which is formed by increasing the number of colored very fine pixels of another single cluster, occurrences of blurring/broken phenomena of narrow lines are reduced, so that an image quality is increased.

Also, according to a second aspect of the invention, a gradation display method includes the steps of dividing an image into a plurality of pixels having fine areas, dividing each of pixels into very fine pixels (Si) having very fine areas, forming an electrostatic latent image in response to a gradation to be displayed, coloring the very fine pixels (Si) based on the electrostatic latent image, displaying the gradation based on a ratio of area of the colored very fine pixels (Si) to that of all very fine pixels (Si) within each of pixels. The second growth core is formed by increasing number of colored very fine pixels of another single cluster. The first growth core is formed by increasing number of colored very fine pixels of a single cluster. The second growth core is formed by increasing number of colored very fine pixels of another single cluster. The image may be formed on a surface of a charged photosensitive drum (15). In the forming step, the very fine pixels (Si) may be irradiated with a light beam (14). In the coloring step, the electrostatic latent image may be developed to form a toner image.

In such a gradation display method of the present invention, in a low gradation level, a first-growth-core-displaying electrostatic latent image capable of coloring the first growth core is grown and a second-growth-core-displaying electrostatic latent image is grown so that the second growth core is not colored. In an intermediate gradation level to a higher gradation level, the second-growth-core-displaying electrostatic latent image is grown so that the second growth core is colored.

Also, the gradation display method of the present invention, may further include the steps of dividing area of one very fine pixel by n and coloring each of divided areas to display the one very fine pixel in a multiple-values manner, where n is a positive integer.

Also in the gradation display method of the present invention, preferably, a dimension of the first growth core is always different from that of the second growth core. In this case, it is possible to preferably avoid occurrences of blurring/broken phenomena of narrow lines, along a screen angle of pixels.

Also, in the gradation display method of the present invention, the dimension of the second growth core may be always made smaller than the dimension of the first growth core. Also a dimension of the second growth core may be always smaller than, or equal to a dimension of the first growth core in a low gradation level; and may be always larger than the dimension of the first growth core in an intermediate gradation level and higher gradation levels thereof.

Further, in the gradation display method of the present invention, a position of the second growth core may be located near a center between the first growth cores. In this case, the blurring/broken phenomena of the narrow lines can be mitigated.

Also, a gradation display method, according to another aspect of the present invention, is featured by that the colored very fine pixel (Si) is formed by employing only the first growth core which is formed by increasing the number of the colored very fine pixels of the single cluster in a low gradation level; and the colored very fine pixel is formed by employing both the first growth core and the second growth core which is formed by increasing the number of the colored very fine pixels of the another single cluster from an intermediate gradation level to a high gradation level.

In the gradation display method of the present invention equipped with the above-described arrangement, the colored very fine pixel is formed by employing only the first growth core which is formed by increasing the number of the colored very fine pixels of the single cluster in the low gradation level; and the colored very fine pixel is formed by employing both the first growth core and the second growth core which is formed by increasing the number of the colored very fine pixels of the last-mentioned single cluster from to intermediate gradation level to the high gradation level. As a consequence, the occurrences of the blurring/broken phenomena of the narrow lines may be reduced, and thus, the image quality may be improved.

Also, in the gradation display method of the present invention, both the first growth core and the second growth core may be grown from the intermediate gradation level up to the high gradation level thereof. Also, the first growth core and the second growth core may be alternately grown from the intermediate gradations level to the high gradation level thereof. In this case, an occurrence of density jumping may be mitigated.

Furthermore, in the gradation display method of the present invention, only the first growth core may be grown in the low gradation level; and the second growth core may be employed and only the second growth core may be grown in the intermediate gradation level and higher gradation levels thereof. Also, the gradation display method of the present invention may be used as a gradation display method for a color image.

BRIEF DESCRIPTION OF THE DRAWINGS

FIG. 1 is a diagram for indicating colored very fine pixels in an embodiment 1 in which while a total number of very fine pixels "Si" which constitute one pixel "S" is defined as 4×8=32, a binary display is performed based upon the respective very fine pixels Si (i=1 to 32); FIG. 1A is a diagram for indicating fourth gradation of colored very fine pixels S1 to S4; and FIG. 1B is a diagram for showing colored very fine pixels S1 to S8 in the case that eighth gradation of display is carried out.

FIG. 2 is a diagram for indicating colored very fine pixels in the embodiment 1 in which a binary display is performed based upon the respective very fine pixels Si (i=1 to 32); FIG. 2A is a diagram for indicating 12-th gradation of colored very fine pixels S1 to S12; and FIG. 2B is a diagram for showing colored very fine pixels S1 to S16 in the case that 16-th gradation of display is carried out.

FIG. 3 is a diagram for indicating colored very fine: pixels in the embodiment 1 in which a binary display is performed based upon the respective very fine pixels Si (i=1 to 32); FIG. 3A is a diagram for indicating 20-th gradation of colored very fine pixels S1 to S20; and FIG. 3B is a diagram for showing colored very fine pixels S1 to S24 in the case that 24-th gradation of display is carried out.

FIG. 4 is a diagram for indicating colored very fine pixels in the embodiment 1 in which a binary display is performed based upon the respective very fine pixels Si (i=1 to 32); FIG. 4A is a diagram for indicating 28-th gradation of colored very fine pixels S1 to S28; and FIG. 4B is a diagram for showing colored very fine pixels S1 to S32 in the case that 32-nd gradation of display is carried out.

FIG. 7 is a diagram for showing a relationship between input data and output data of an LUT (lookup table).

FIG. 10 is an explanatory diagram for explaining a threshold value table 125 (see FIG. 6) into which X-address signals "0000" to "0100" and Y-address signals "0000" to "0111" are entered, namely, a diagram for representing a relationship between the X-address/Y-address signals, and the very fine pixels S1 to S32 arranged in a matrix form of 8×4, which constitute one pixel "S".

FIG. 11 is an explanatory diagram for explaining the threshold value table 125 (see FIG. 6) into which the X-address signals "0000" to "0100" and the Y-address signals "0000" to "0111" are entered, namely, a diagram for representing threshold value data set to the respective very fine pixels S1 to S32.

FIG. 12 is a diagram for indicating colored very fine pixels in an embodiment 2 in which while a total number of very fine pixels "Si" which constitute one pixel "S" is defined as 4×8=32, a binary display is performed based upon the respective very fine pixels Si (i=1 to 32); FIG. 12A is a diagram for indicating fourth gradation of colored very fine pixels S1 to S4; and FIG. 12B is a diagram for showing colored very fine pixels S1 to S8 in the case that eighth gradation of display is carried out.

FIG. 13 is a diagram for indicating colored very fine pixels in the embodiment 2 in which a binary display is performed based upon the respective very fine pixels Si (i=1 to 32); FIG. 13A is a diagram for indicating 12-th gradation of colored very fine pixels S1 to S12; and FIG. 13B is a diagram for showing colored very fine pixels S1 to S16 in the case that 16-th gradation of display is carried out.

FIG. 14 is a diagram for indicating colored very fine pixels in the embodiment 2 in which a binary display is performed based upon the respective very fine pixels Si (i=1 to 32); FIG. 14A is a diagram for indicating 20-th gradation of colored very fine pixels S1 to S20; and FIG. 14B is a diagram for showing colored very fine pixels S1 to S24 in the case that 24-th gradation of display is carried out.

FIG. 15 is a diagram for indicating colored very fine pixels in the embodiment 2 in which a binary display is performed based upon the respective very fine pixels Si (i=1 to 32); FIG. 15A is a diagram for indicating 28-th gradation of colored very fine pixels S1 to S28; and FIG. 15B is a diagram for showing colored very fine pixels S1 to S32 in the case that 32-nd gradation of display is carried out.

FIG. 16 is a diagram for indicating colored very fine pixels in an embodiment 3 in which while a total number of very fine pixels "Si" which constitute one pixel "S" is defined as 6×6=36, a binary display is performed based upon the respective very fine pixels Si (i=1 to 36).

FIG. 17 is a diagram for indicating colored very fine pixels in an embodiment 4 in which while a total number of very fine pixels "Si" which constitute one pixel "S" is defined as 6×6=36, a binary display is performed based upon the respective very fine pixels Si (i=1 to 36).

FIG. 18 is a diagram for indicating colored very fine pixels in an embodiment 5 in which while a total number of very fine pixels "Si" which constitute one pixel "S" is defined as 2×10=20, a binary display is performed based upon the respective very fine pixels Si (i=1 to 20).

FIG. 19 is a diagram for indicating colored very fine pixels in an embodiment 6 in which while a total number of very fine pixels "Si" which constitute one pixel "S" is defined as 2×10=20, a binary display is performed based upon the respective very fine pixels Si (i=1 to, 20).

FIG. 20 is a diagram for showing pixels and very very fine pixels an embodiment 7 in which while a total number of very fine pixels which constitute one pixel "S" is defined as 4×8=32, the respective very fine pixels are displayed by four values based upon very very fine pixels Si (i=1 to 128) obtained by dividing the respective very fine pixels (i=1 to 32) by 4.

FIG. 21 is a diagram for showing 32-nd gradation of colored very fine pixels S1 to S32.

FIG. 22 is a diagram for representing 40-th gradation of colored very fine pixels S1 to S40.

FIG. 23 is a diagram for showing 56-th gradation of colored very fine pixels S1 to S56.

FIG. 24 is a diagram for representing 64-th gradation of colored very fine pixels S1 to S64.

FIG. 25 is a diagram for showing 80-th gradation of colored very fine pixels S1 to S80.

FIG. 26 is a diagram for representing 96-th gradation of colored very fine pixels S1 to S96.

FIG. 27 is a diagram for indicating the colored very fine pixels in the prior art in which while a total number of the very fine pixels "Si" which constitute one pixel "S" is defined as 4×8=32, the binary display is performed based upon the respective very fine pixels Si (i=1 to 32); FIG. 27A is a diagram for indicating fourth gradation of the colored very fine pixels S1 to S4; and FIG. 27B is a diagram for showing the colored very fine pixels S1 to S8 in the case that the eighth gradation of display is carried out.

FIG. 28 is a diagram for indicating colored very fine pixels in the prior art in which the binary display is performed based upon the respective very fine pixels Si (i=1 to 32); FIG. 28A is a diagram for indicating the 12-th gradation of the colored very fine pixels S1 to S12; and FIG. 28B is a diagram for showing the colored very fine pixels S1 to S16 in the case that the 16-th gradation of display is carried out.

FIG. 29 is a diagram for indicating the colored very fine pixels in the prior art in which the binary display is performed based upon the respective very fine pixels Si (i=1 to 32); FIG. 29A is a diagram for indicating the 20-th gradation of the colored very fine pixels S1 to S20; and FIG. 29B is a diagram for showing the colored very fine pixels S1 to S24 in the case that the 24-th gradation of display is carried out.

FIG. 30 is a diagram for indicating the colored very fine pixels in the prior art in which the binary display is performed based upon the respective very fine pixels Si (i=1 to 32); FIG. 30A is a diagram for indicating the 28-th gradation of the colored very fine pixels S1 to S28; and FIG. 30B is a diagram for showing the colored very fine pixels S1 to S32 in the case that the 32-nd gradation of display is carried out.

DETAILED DESCRIPTION OF THE PREFERRED EMBODIMENTS

Figure 5:
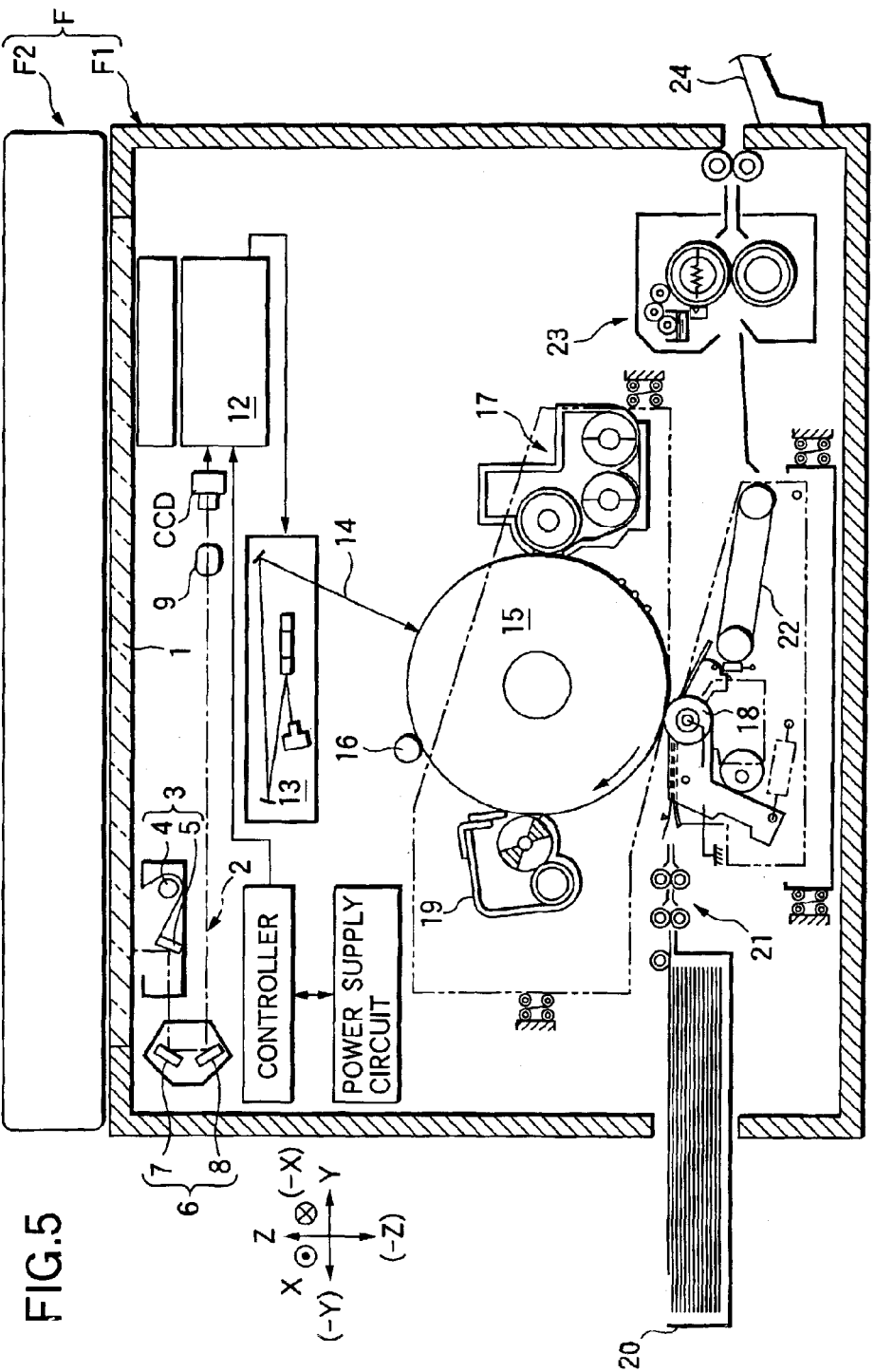
FIG. 5 is an explanatory diagram for showing an entire arrangement of a digital copying machine "F" to which the present invention is applied.

Referring now to drawings, a concrete example (namely, embodiment 1) of a gradation display apparatus according to an embodiment of the present invention will be described. However, the present invention is not limited to the below-mentioned embodiments.

(Embodiment 1)

A gradation display apparatus according to an embodiment of the invention will now be described with reference to drawings.

FIG. 1 is an explanatory diagram for explaining colored very fine pixels in an embodiment 1 in which while a total number of very fine pixels "Si" which constitute the above-described one pixel "S" is defined by 4×8=32, a binary display is performed by the respective very fine pixels Si (i=1 to 32). FIG. 1A is a diagram for representing fourth gradation of colored very fine pixels S1 to S4, and FIG. 1B is a diagram for showing colored very fine pixels S1 to S8 in the case that a display of eighth gradation is carried out.

FIG. 2A to FIG. 4B are diagrams for indicating 12-th gradation of colored very fine pixels S1 to S12, 16-th gradation of colored very fine pixels S1 to S16, 20-th gradation of colored very fine pixels S1 to S20, 24-th gradation of colored very fine pixels S1 to S24, 28-th gradation of colored very fine pixels S1 to S28, and 32-nd gradation of colored very fine pixels S1 to S32, respectively.

A screen angle "θ" is equal to 45 degrees, and corresponds to an angle of a straight line with respect to a horizontal line direction, while this straight line is to connect centers of adjacent pixels as to each of the above-described pixels "S". An increasing direction of a colored very fine pixel "Si" contained in each of pixels "S" is set to a direction of the screen angle "θ".

In FIG. 1A, the colored very fine pixels for representing the fourth gradation are four pieces of very fine pixels Si (i=1 to 4). It should be noted that although not shown in the drawing, in zeroth gradation, all of very fine pixels Si (i=1 to 32) are not colored, and in first gradation, one very fine pixel Si (i=1) is colored.

In FIG. 1A to FIG. 4B, until the 16-th gradation of FIG. 2B is displayed, a cluster (group) of colored very fine pixels is one, and a direction along which colored very fine pixels are grown (namely, growth direction of growth core) is the same as the screen angle "θ"=45 degrees.

Next, a description now be made of an arrangement of a gradation display apparatus capable of displaying the above-explained gradation of the colored very fine pixels shown in FIG. 1.

FIG. 5 is an explanatory diagram for explanatorily showing an entire arrangement of a digital copying machine "F" to which the present invention has been applied.

The digital copying machine "F" is arranged by a machine main body unit "F1", and a cover "F2" connected to an upper surface of this machine main body unit F1 by employing a hinge.

The above-described machine main body unit F1 is provided on the upper surface thereof with a platen (original mounting base) 1 constituted by transparent glass. An exposing optical system 2 is arranged under this platen 1. This exposing optical system 2 contains a movable lamp unit 3. This lamp unit 3 is constituted in such a manner that a lamp 4 for illuminating an original and a first mirror 5 are arranged in an integral form. Also, the exposing optical system 2 contains a moving mirror unit 6 which is moved at a ½ speed of the move speed of the lamp unit 3. This moving mirror unit 6 is: constituted by a second mirror 7 and a third mirror 8. Also, the exposing optical system 2 contains a lens 9. Then, the digital copying machine F is arranged as follows: When the lamp unit 3 is moved parallel to an original along a forward/backward direction and the moving mirror unit 6 is moved over a half of the travel distance of the lamp unit 3 at a half of the move speed of this lamp unit 3, since a distance between the original and the lens 9 is kept constant, reflection light from the original which is illuminated by the lamp 4 passes through the exposing optical system 2, and is then converged to a CCD (charge-coupled device) of an image reading unit.

In the CCD image reading unit, amounts of reflection light received by the respective pixels of the original are converted into electric signals. The electric signals are transmitted as image data (density data) to an image processing unit 12. In the image processing unit 12, the density data is converted into an area ratio of colored very fine pixels, and also is converted into binary serial data every scanning line in order that the binary serial data can be outputted as a raster image by a laser scanner 13 (will be discussed later). A laser light beam (namely, light beam) projected from the laser scanner 13 is turned ON/OFF in response to this serial data, so that an image is written into a drum-shaped photosensitive member 15.

Around the above-described photosensitive member 15, a charge roller 16 for charging operation, a developing apparatus 17, a charge roller 18 for transferring operation, a cleaner unit 19, and the like are arranged along a rotating direction of this photosensitive member 15. Also, a transfer paper storage tray 20, and a paper supply mechanism 21 are arranged in the machine main body unit F1. The paper supply mechanism 21 supplies transfer paper stored in this transfer paper storage tray 20 to a space defined between the photosensitive member 15 and the transfer charger (charge roller) 18. A transport mechanism 22 is provided in the machine main body unit F1. The transport mechanism 22 exfoliates transfer-ended paper from the photosensitive member 15, and then, transports this exfoliated transfer-ended paper. This paper passes between the photosensitive member 15 and the transfer-operation charger 18, and the transfer operation has been accomplished with respect to this paper. Furthermore, a fixing unit 23 and a paper ejection tray 24 are arranged in the machine main body unit F1. The fixing unit 23 fixes image data-formed on the transfer-ended paper which is transported by the transporting mechanism 22. The paper ejection tray 24 receives the transfer-ended paper delivered from this fixing unit 23.

Figure 6:
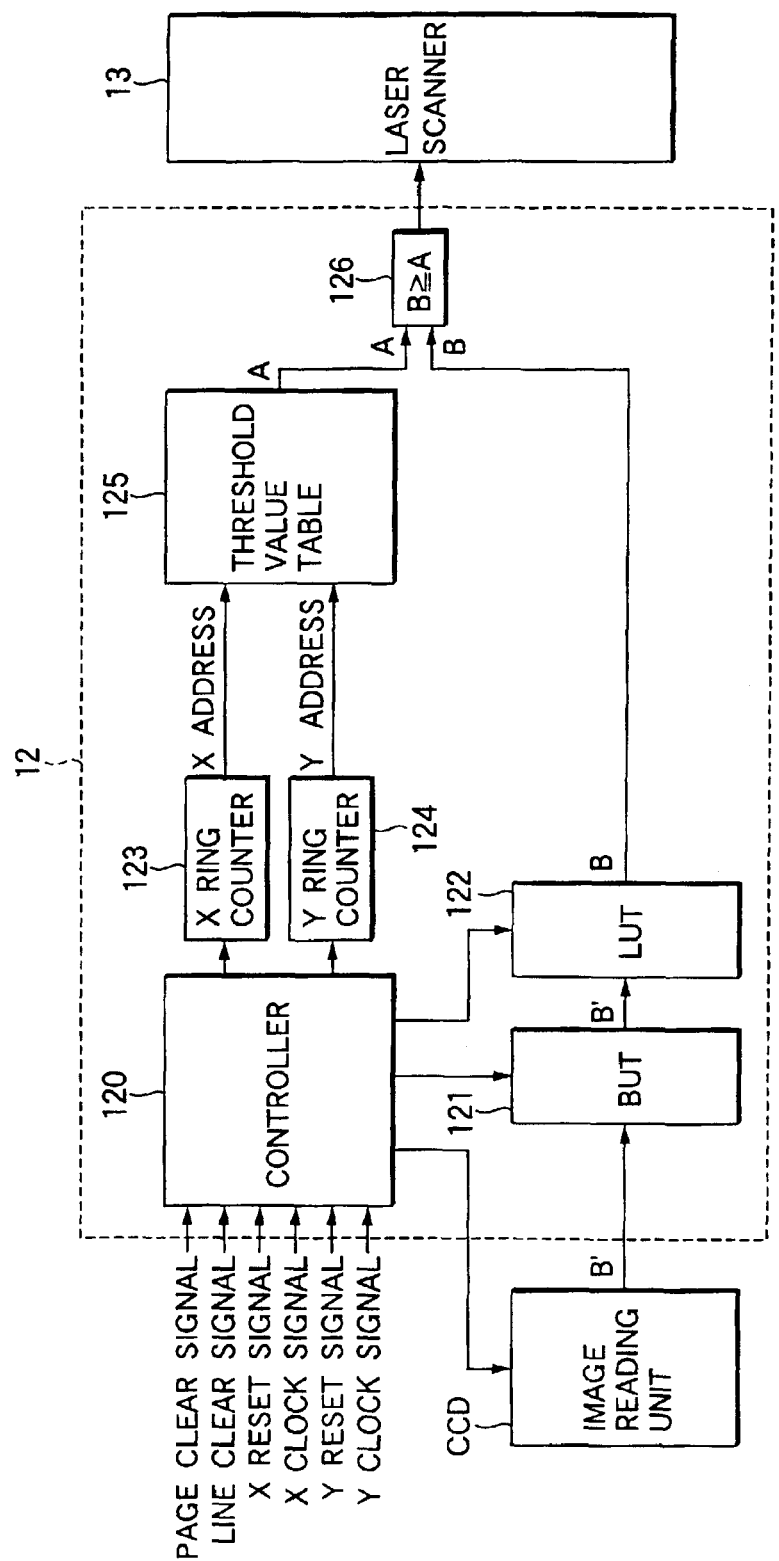
FIG. 6 is an explanatory diagram for indicating an arrangement of the above-described image processing unit employed in the embodiment 1 of the present invention.

FIG. 6 is an explanatory diagram for explaining an arrangement of the above-described image processing unit 12 employed in the embodiment 1 of the present invention.

The image processing unit 12 shown in FIG. 6 is constituted by a threshold-value type colored very fine pixel generator to which image data (density data) "B'" is inputted from the above-described CCD image reading unit. This image data B' is such a value which is obtained by D/A-converting an analog output signal acquired from a sensor such as a CCD, and corresponds to 8-bit digital data defined from "00000000" (=0) upto "11111111" (=255). This image data B= is stored into a line buffer 121, the reading/writing operations of which are controlled by a controller 120 of the image processing unit 12. The line buffer 121 may include a shift register, a memory, and the like. This line buffer 121 has a storage capacity capable of storing thereinto one line of the image data B'.

FIG. 7 is a diagram for showing a relationship between input data and output data of an LUT (lookup table)

The 8-bit image data B' stored in the line buffer 121 is inputted into the lookup table LUT. This lookup table LUT converts the entered 8-bit image data (density data) B' defined from "00000000" (=0) up to "11111111" (=255) into 5-bit gradation data "B" defined from "000000" (=0) up to "100000" (=32) as indicated in FIG. 7.

The above-described controller 20 is constituted by a counter and the like. This controller 20 may be operated based upon an X-clock signal, an X-reset signal, a Y-clock signal, a Y-reset signal, a page clear signal, and also a line clear signal. The X-clock signal is synchronized with timing at which the laser light 14 (see FIG. 5) scans the respective very fine pixels. The X-reset signal is produced every time the laser light 14 scans the respective pixels (8 very fine pixels). The Y-clock signal is produced every time the laser light 14 scans one line over the photosensitive drum 15. The Y-reset signal is produced every time the laser light 14 scans four lines (namely, lines containing four very fine pixels arranged along sub-scanning direction). These four very fine pixels correspond to one pixel made of these very fine pixels. The page clear signal is produced at a head of one page of a print. The line clear signal is produced at a head of each of line scanning operations. It should be noted-that generation timing of these signals is indicated in FIG. 8 and FIG. 9.

Figure 8:
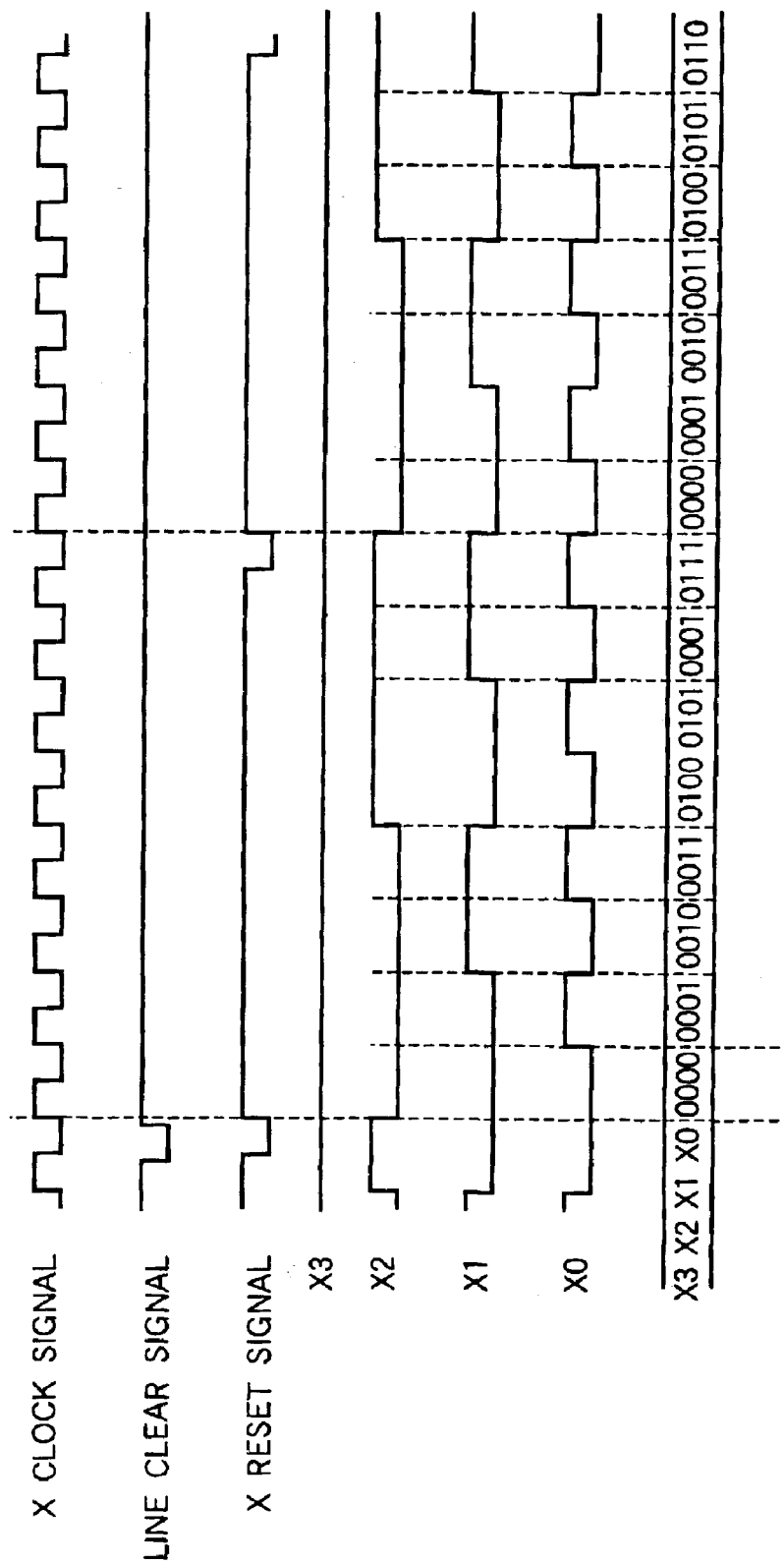
FIG. 8 is a timing chart for representing operation signals indicated in FIG. 6.

FIG. 8 is a timing chart of the operation signals shown in FIG. 6.

Figure 9:
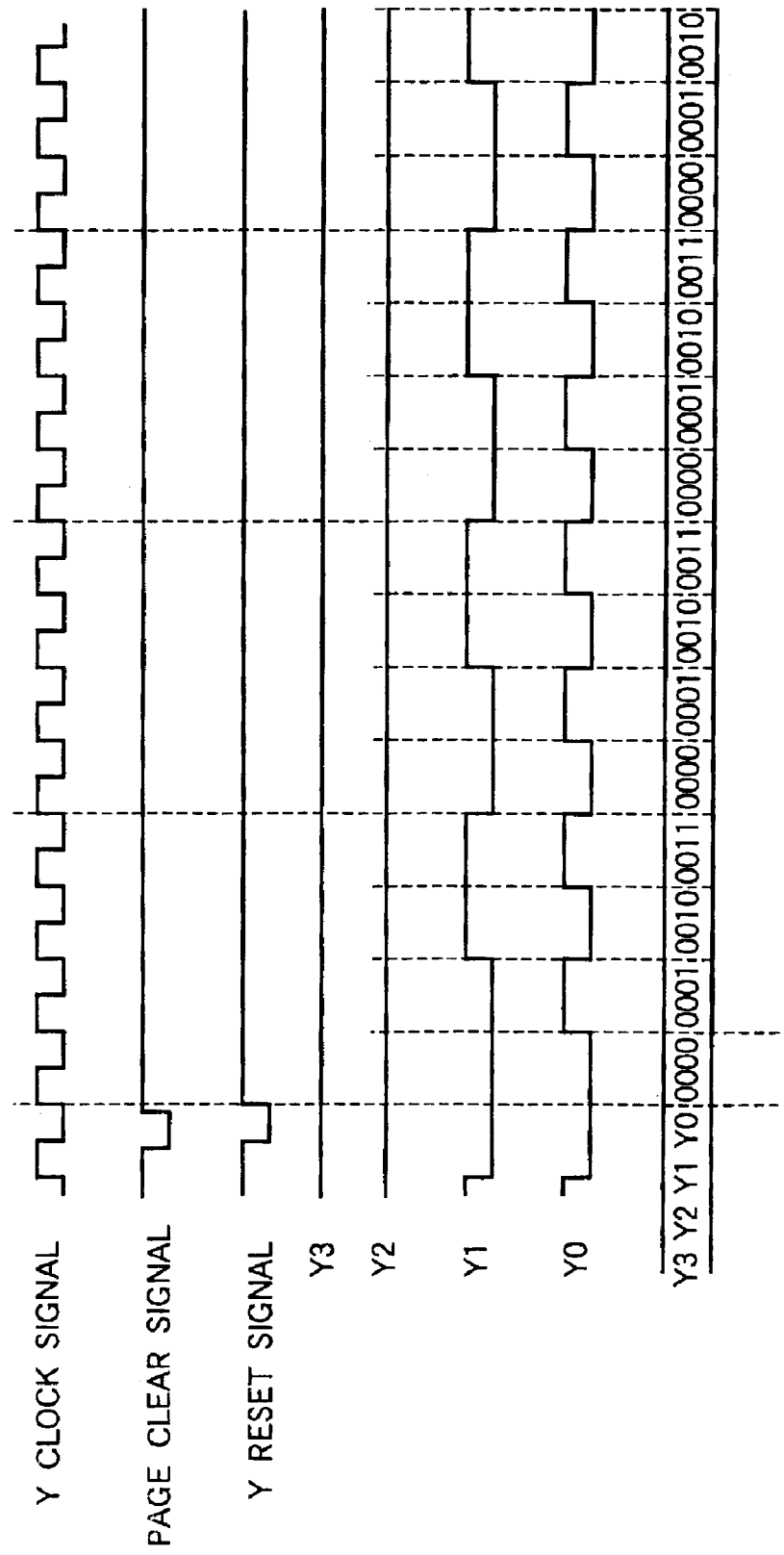
FIG. 9 is a timing chart for representing operation signals indicated in FIG. 6.

FIG. 9 is a timing chart of the operation signals indicated in FIG. 6.

In FIG. 8 and FIG. 9, 4-bit X-address signals "X3, X2, X1, X0" (see FIG. 8) are outputted from an X-ring counter 123 in response to a signal inputted into the controller 120. Also, 4-bit Y-address signals "Y3, Y2, Y1, Y0" (see FIG. 9) are outputted from a Y-ring counter 124 in response to a signal inputted into the controller 120. As indicated in FIG. 8, the above-described X-address signals "X3, X2, X1, X0" correspond to values of "0000" (=0) to "0111" (=7) respectively, whereas as shown in FIG. 9, the above-explained Y-address signals "Y3, Y2, Y1, Y0" correspond to values of "0000" (=0) to "0011" (=3) respectively.

FIG. 10 and FIG. 11 are explanatory diagrams for explaining a threshold value table 125 (see FIG. 6) into which the above-described X-address signals "0000" to "0100", and Y-address signals "0000" to "0011". FIG. 10 is a diagram for indicating a relationship among the above-described X-address signal and Y-address signal, and the very fine pixels S1 to S32 which are arranged in a matrix form of 8×4 which constitute one pixel "S". As apparent from FIG. 10, any one of these very fine pixels S1 to S32 is specified based upon the X-address signal and the Y-address signal.

FIG. 11 is a diagram for representing threshold value data which are set to the respective very fine pixels S1 to S32. The threshold value data are stored in binary codes as indicated as "A" (threshold value data) in FIG. 11.

The threshold value data A stored in the threshold value table 125 is read out in response to the X-address signal and the Y-address signal, which are outputted from the X-ring counter and the Y-ring counter, and is then outputted to a comparator 126.

The threshold value data "A" and the image data "B" derived from the LUT (lookup table) 122 are inputted into this comparator 126. When B≧A, the comparator 126 outputs "1", whereas when B<A, the comparator 126 outputs "0".

Then, in this embodiment 1, when "1" is inputted, the laser scanner 13 emits the laser light, whereas when "0" is inputted, this laser scanner 13 does not emit the laser light. (Operation of Embodiment 1)

Next, operations of the embodiment 1 of the present invention adopting the above-described structure will now be described with reference mainly to FIG. 6 to FIG. 11.

When a line of a first pixel (corresponding to 4 lines of very fine pixels) is scanned, a scanning operation of a line designated by a Y-address "0000" is commenced in response to a page clear signal shown in FIG. 9 (namely, scanning operation of first line of very fine pixels is commenced, namely, scanning operation of first line along sub-scanning direction is commenced) Then, a scanning operation along a main scanning direction is commenced in response to the line clear signal shown in FIG. 8.

Now, an explanation will be given on such a case that a single pixel (namely, pixel constituted by 32 pieces of very fine pixels) is scanned, the gradation data B of which is, for example, "00100" (=4), B="000100"=(4) is inputted into the comparator 126.

Then, when such a very fine pixel Si is scanned, the X-address of which is "0000", and the Y-address of which is "0000", threshold value data "A" which is read from the threshold value table 125 and then is inputted into the comparator 126 corresponds to "000000" (=0) as indicated in FIG. 10 and FIG. 11. In this case, since B≧A, "1" is outputted from the comparator 126. As a consequence, the laser light is irradiated to the very fine pixel S1. Next, when the very fine pixel S5 is scanned, since A>B, the laser light is not irradiated to the very fine pixel S5. Similarly, in the case that the very fine pixels S9, S13, S25, S17, S21 and S29 shown in FIG. 10 are scanned, since A>B, no laser light is irradiated onto these very fine pixels.

When the scanning operations of the first line of these very fine pixels S1 to S29 are accomplished in this manner, scanning operations of very fine pixels belonging to another pixel which is located adjacent to the above-described first pixel along the main scanning direction are carried out in response to the X-reset signal of FIG. 8. When the scanning operations of one line of all of these very fine pixels arranged along the main scanning direction are completed in this manner, the Y-address signals "Y3, Y2, Y1, Y0" become "0001" in response to the Y-clock signal of FIG. 9, so that scanning operations of a second line of the very fine pixels, namely, the scanning operations of the second line along the sub-scanning direction are commenced. Then, the scanning operations along the main scanning directions are commenced in response to the line clear signal shown in FIG. 8.

Then, the above-described gradation data B="000100"= (4) is again inputted into the comparator 126. Then, when such a very fine pixels S6 is scanned, the X-address of which is "0000", and the Y-address of which is "0001", threshold value data "A" which is read from the threshold value table 125 and then is inputted into the comparator 126 corresponds to "000110" (=6), as indicated in FIG. 10 and FIG. 11. In this case, since A>B, "0" is outputted from the comparator 126. As a consequence, the laser light is not irradiated to the very fine pixel S6. Similarly, in the case that the very fine pixels S10, S14, S30, S18, S22, and S26 are scanned, since A>B, no laser light is irradiated onto these very fine pixels. To the contrary, in such a case that the very fine pixel S2 is scanned, threshold value data "A" which is read from the threshold value table 125 and then is inputted into the comparator 126 corresponds to "000010" (=2) as indicated in FIG. 11. In this case, since B≧A, "1" is outputted from the comparator 126. As a consequence, the laser light is irradiated to the very fine pixel S2.

A similar scanning operation is carried out as to both a third line of very fine pixels whose Y-address is equal to "0010" and also a fourth line of very fine pixels whose Y-address is equal to "0011", and then, in the case that both the very fine pixels S3 and S4 are scanned, it becomes, B≧A, and thus the laser light is irradiated onto these very fine pixels S3 and S4. However, no laser light is irradiated onto other very fine pixels.

As a consequence, since the image exposing operation is carried out by employing the laser light, such colored very fine pixels shown in FIG. 1A and FIG. 4B can be recorded.

As apparent from FIG. 1A to FIG. 4B, the growth cores corresponding to the clusters (groups) of the colored very fine pixels from the zeroth gradation to the 16-th gradation are arranged in such an arranging ratio manner that one growth core (single growth core) is arranged in correspondence with one pixel, whereas the growth cores corresponding to the clusters of the colored very fine pixels from the 17-th gradation and higher gradation are arranged in such an arranging ratio manner that two growth cores are arranged in correspondence with one pixel. As previously explained, since the two growth cores are arranged, the screen line number may be increased in the quasi manner in the intermediate gradation to the high gradation (higher than, or equal to 17-th gradation). As a consequence, even when the narrow lines and the characters are present along the screen angles in the intermediate gradation to the high gradation, blurring and broken phenomena of the narrow lines do not become conspicuous. As a result, the occurrences of blurring/broken phenomena of the narrow lines along the screen angle of the pixels can be prevented in a simple method.

Also, in this embodiment 1, since the area of the second growth core is set to be continuously smaller than, or equal to the area of the first growth core, the screen line number from the low gradation to the intermediate gradation (lower than, or equal to 16-th gradation) is not increased. The deterioration of the IOT defect caused by this fact can be avoided.

(Embodiment 2)

FIG. 12 is an explanatory diagram for explaining colored very fine pixels in an embodiment 2 in which while a total number of very fine pixels "Si" which constitute the above-described one pixel "S" is defined by 4×8=32, a binary display is performed by the respective very fine pixels Si (i=1 to 32). FIG. 12A is a diagram for representing fourth gradation of colored very fine pixels S1 to S4, and FIG. 12B is a diagram for showing colored very fine pixels S1 to S8 in the case that a display of eighth gradation is carried out.

FIG. 13A to FIG. 15B are diagrams for indicating 12-th gradation of colored very fine pixels S1 to S12, 16-th gradation of colored very fine pixels S1 to S16, 20-th gradation of colored very fine pixels S1 to S20, 24-th gradation of colored very fine pixels S1 to S24, 28-th gradation of colored very fine pixels S1 to S28, and 32-nd gradation of colored very fine pixels S1 to S32, respectively.

A screen angle "θ" is also equal to 45 degrees in this embodiment 2. In this embodiment 2, as apparent from FIG. 12A to FIG. 15B, the growth cores corresponding to the clusters (groups) of the colored very fine pixels from the zeroth gradation to the 12-th gradation are arranged in such an arranging ratio manner that one growth core is arranged in correspondence with one pixel, whereas the growth cores corresponding to the clusters of the colored very fine pixels from the 13-th gradation and higher gradation are arranged in such an arranging ratio manner that two growth cores are arranged in correspondence with one pixel. As previously explained, since the two growth cores are arranged also in this embodiment 2, the occurrences of blurring/broken phenomena of the narrow lines along the screen angle of the pixels can be prevented in a simple method.

Also, in this embodiment 2, as compared with the above-described embodiment 1, the second growth core is grown in the lower gradation (namely, 13-th gradation). However, since the very fine pixels to be colored are present in a discrete condition, it is possible to suppress such a fact that the screen line number is increased in the low gradation to the intermediate gradation (namely, lower than, or equal to 12-th gradation). As a consequence, deteriorations of the IOT defect can be avoided.

(Embodiment 3)

FIG. 16 is an explanatory diagram for explaining colored very fine pixels in an embodiment 3 in which while a total number of very fine pixels "Si" which constitute the above-described one pixel "S" is defined by 6×6=36, a binary display is carried out by the respective very fine pixels Si (i=1 to 36).

In this embodiment 3, a screen angle of pixels is equal to 90 degrees. In this embodiment 3, as apparent from FIG. 16, the growth cores corresponding to the clusters (groups) of the colored very fine pixels from the zeroth gradation to the 18-th gradation are arranged in such an arranging ratio manner that one growth core is arranged in correspondence with one pixel, whereas the growth cores corresponding to the clusters of the colored very fine pixels from the 19-th gradation and higher gradation are arranged in such an arranging ratio manner that two growth cores are arranged in correspondence with one pixel. Since the two growth cores are arranged, also in this embodiment 3, the occurrences of blurring/broken phenomena of the narrow lines along the screen angle of the pixels can be prevented in a simple method.

(Embodiment 4)

FIG. 17 is an explanatory diagram for explaining colored very fine pixels in an embodiment 4 in which while a total number of very fine pixels "Si" which constitute the above-described one pixel "S" is defined by 6×6=36, a binary display is carried out by the respective very fine pixels Si (i=1 to 36).

In this embodiment 4, a screen angle of pixels is also equal to 90 degrees. In this embodiment 4, as apparent from FIG. 17, the growth cores corresponding to the clusters (groups) of the colored very fine pixels from the zeroth gradation to the 12-th gradation are arranged in such an arranging ratio manner that one growth core is arranged in correspondence with one pixel, whereas the growth cores corresponding to the clusters of the colored very fine pixels from the 13-th gradation and higher gradation are arranged in such an arranging ratio manner that two growth cores are arranged in correspondence with one pixel. Since the two growth cores are arranged, also in this embodiment 4, the occurrences of blurring/broken phenomena of the narrow lines along the screen angle of the pixels can be prevented in a simple method.

(Embodiment 5)

FIG. 18 is an explanatory diagram for explaining colored very fine pixels in an embodiment 5 in which while a total number of very fine pixels "Si" which constitute the above-described one pixel "S" is defined by 2×10=20, a binary display is carried out by the respective very fine pixels Si (i=1 to 20).

In this embodiment 5, a screen angle of pixels is equal to 27 degrees. In this embodiment 5, as apparent from FIG. 18, the growth cores corresponding to the clusters (groups) of the colored very fine pixels from the zeroth gradation to the 10-th gradation are arranged in such an arranging ratio manner that one growth core is arranged in correspondence with one pixel, whereas the growth cores corresponding to the clusters of the colored very fine pixels from the 11-th gradation and higher gradation are arranged in such an arranging ratio manner that two growth cores are arranged in correspondence with one pixel. Since the two growth cores are arranged, also in this embodiment 5, the occurrences of blurring/broken phenomena of the narrow lines along the screen angle of the pixels can be prevented in a simple method.

(Embodiment 6)

FIG. 19 is an explanatory diagram for explaining colored very fine pixels in an embodiment 6 in which while a total number of very fine pixels "Si" which constitute the above-described one pixel "S" is defined by 2×10=20, a binary display is carried out by the respective very fine pixels Si (i=1 to 20).

In this embodiment 6, a screen angle of pixels is also equal to 27 degrees. In this embodiment 6, as apparent from FIG. 17, the growth cores corresponding to the clusters (groups)of the colored very fine pixels from the zeroth gradation to the 6-th gradation are arranged in such an arranging ratio manner that one growth core is arranged in correspondence with one pixel, whereas the growth cores corresponding to the clusters of the colored very fine pixels from the 7-th gradation and higher gradation are arranged in such an arranging ratio manner that two growth cores are arranged in correspondence with one pixel. Since the two growth cores are arranged, also in this embodiment 6, the occurrences of blurring/broken phenomena of the narrow lines along the screen angle of the pixels can be prevented in a simple method.

(Embodiment 7)

FIG. 20 is a diagram for showing pixels and very very fine pixels in an embodiment 7 in which while a total number of very fine pixels which constitute the above-explained one pixel "S" is defined by 4×8=32, each of the above-described very fine pixels is displayed in a four-value representation manner by employing very very fine pixels "Si" (i=1 to 128) obtained by dividing each of the very fine pixels (i=1 to 32) by four.

FIG. 21 to FIG. 26 are diagrams for indicating 32-nd gradation of colored very fine pixels S1 to S32, 40-th gradation of colored very fine pixels S1 to S40, 56-th gradation of colored very fine pixels S1 to S56, 64-th gradation of colored very fine pixels S1 to S64, 80-th gradation of colored very fine pixels S1 to S80, and 96-th gradation of colored very fine pixels S1 to S96, respectively.

A screen angle "θ" is equal to 45 degrees, and corresponds to an angle of a straight line with respect to a horizontal line direction, while this straight line connects centers of adjacent pixels as to each of the above-described pixels "S". An increasing direction of colored very very fine pixels "Si" contained in each of pixels "S" is set to a direction of the screen angle "θ".

In FIG. 21, colored very fine pixels for displaying the 32-nd gradation correspond to 32 pieces of very very fine pixels Si (i=1 to 32). It should also be understood that although not shown in the drawing, all of the very very fine pixels Si (i=1 to 128) in the zeroth gradation are non-colored pixels. In the first gradation, such a portion corresponding to one piece of very very fine pixel Si (i=1) is irradiated by laser light (image exposuring operation) as a colored very very fine pixel, so that an electrostatic latent image is formed. Until the 32-nd gradation of FIG. 21 is displayed, a cluster (group) of colored very fine pixels is equal to 1, when adjacent pixels are considered, and a direction along which the colored very fine pixels are grown (namely, growing direction of growth core) is the same as the screen angle "θ" =45 degrees. In other words, only a first growth core is grown until the 32-nd gradation is displayed.

In FIG. 22, in the case that the 33-rd gradation and the 40-th gradation are displayed, the very very fine pixels 33, 35, 37, 39 which form a first growth core, and the very very fine pixels 34, 36, 38, 40 which form a second growth core are alternately irradiated by laser light, so that an electrostatic latent image is formed. At this time, since the very very fine pixels 33, 35, 37, 39 are connected to the colored very very fine pixels of the first growth core, these very very fine pixels 33, 35, 37, 39 are colored. However, since the very very fine pixels 34, 36, 38, 40 of the second growth core are separated from other colored very very fine pixels, and electrostatic latent images are solely formed, there is such a case that these very very fine pixels 34, 36, 38, 40 are not colored. In other words, the second growth core in this case is not colored, but the electrostatic latent image is merely grown. For example, it is assumed that the developing apparatus 17 of the image forming apparatus has characteristic that when four pieces of very very fine pixels are continuously formed, these very very fine pixels are colored. In this case, when electrostatic latent images of these four very very fine pixels are formed in a continuous manner, these four very very fine pixels are colored at the same time. It is so assumed that the developing apparatus 17 of this embodiment 7 owns such a characteristic.

In FIG. 23, in the case that the 40-th gradation to the 56-th gradation are displayed, the very very fine pixels 41, 43, - - -, 55 which form a first growth core, and the very very fine pixels 42, 44, - - -, 56 which form a second growth core are alternately irradiated by laser light, so that an electrostatic latent image is formed. At this time, since the very very fine pixels 41, 43, - - -, 55 are connected to the colored very very fine pixels of the first growth core, these very very fine pixels 41, 43, - - -, 55 are colored. However, since the very very fine pixels 42, 44, - - -, 56 of the second growth core are not brought into such a condition that four pieces of very very fine pixels are continued respectively, these very very fine pixels 42, 44, - - -, 56 are not colored.

In FIG. 24, in the case that the 57-th gradation to the 64-th gradation are displayed, the very very fine pixels 57, 59, - - -, 63 which form a first growth core, and the very very fine pixels 58, 60, - - -, 64 which form a second growth core are alternately irradiated by laser light, so that an electrostatic latent image is formed. At this time, since the very very fine pixels 57, 59, - - -, 63 are connected to the colored very very fine pixels of the first growth core, these very very fine pixels 57, 59, - - -, 63 are colored. Also, since the very very fine pixels 58, 60, - - -, 64 of the second growth core are brought into such a condition that the four very very fine pixels are continued, respectively, four pieces of these connected very very fine pixels are colored at the same time.

In FIG. 25, in the case that the 65-th gradation to the 80-th gradation are displayed, the very very fine pixels 55, 67, - - -, 79 which form a first growth core, and the very very fine pixels 66, 68, - - -, 80 which form a second growth core are alternately irradiated by laser light, so that an electrostatic latent image is formed. At this time, since the respective very very fine pixels are connected to the colored very very fine pixels of the first growth core and the second growth core, these very very fine pixels are colored.

In FIG. 26, in the case that the 81-st gradation to the 96-th gradation are displayed, since the respective very very fine pixels 81 to 96 are connected to the colored very very fine pixels of the first growth core and the second growth core, these very very fine pixels 81 to 96 are colored. In the 97th gradation to the 128-th gradation, a similar operation is carried.

This embodiment 7 owns such an effect that an occurrence of density jumping may be reduced. That is to say, in such a case that image reproducing precision by an image output apparatus is low which is constituted by the image processing unit 12, the laser scanner 13, and the developing apparatus 17, even when the colored area of the second growth core is not increased, the colored area of the first growth core is increased, so that the occurrence of the density jumping maybe reduced.

(Modification)

While the embodiments of the present invention have been described in detail, the present invention is not limited only to the above, described embodiments, but may be modified within the technical scope of the present invention recited in the appending claims of the present invention.

(H01) The present invention may be supplied to printers, facsimiles, and full-color image forming apparatus other than monochromatic copying machines.

(H02) In the case that the intermediate gradation display is performed, font memories for storing thereinto colored very fine pixels in each of the gradation may be used instead of the threshold value tables.

(H03) As to the shapes of the pixels and the quantity of the very fine pixels contained in a single pixel, other various shapes and other quantities may be employed.

(H04) In accordance with the present invention, the above-described very fine pixel may be displayed in a multi-value representation (for instance, such a 4-value display is performed by that one very fine pixel is divided by 4, 1/4, 2/4, 3/4, and 4/4 of area of this very fine pixel are colored).

The above-described gradation display method of the present invention may achieve the below-mentioned effect (E01).

(E01) A colored very fine pixel is formed by both a first growth core which is formed by increasing a total number of colored very fine pixels of a single cluster, and also a second growth core which is formed by increasing a total number of colored very fine pixels of another single cluster. As a result, an occurrence of a blurring phenomenon of narrow lines and an occurrence of a broken phenomenon of narrow lines are reduced, so that an image quality can be improved. In particular, the occurrences of blurring/broken phenomena of the narrow lines along a screen angle of pixels can be avoided by a simple method.

What is claimed is:

1. A gradation display method comprising the steps of:
dividing an image into a plurality of pixels having fine areas;
dividing each of fine pixels into very fine pixels having very fine areas; and
displaying gradation based on a ratio of area of colored very fine pixels to that of all very fine pixels within each of pixels,
wherein the colored very fine pixel formed of a first growth core and a second growth core;
wherein the first growth core is formed by increasing number of colored very fine pixels of a single cluster; and
wherein the second growth core is formed by increasing number of colored very fine pixels of another single cluster.

2. A gradation display method comprising the steps of:
dividing an image into a plurality of pixels having fine areas;
dividing each of pixels into very fine pixels having very fine areas;
forming an electrostatic latent image in response to a gradation to be displayed;
coloring the very fine pixels based on the electrostatic latent image;
displaying the gradation based on a ratio of area of the colored very fine pixels to that of all very fine pixels within each of pixels;
wherein the colored very fine pixel formed of a first growth core and a second growth core;
wherein the first growth core is formed by increasing number of colored very fine pixels of a single cluster; and
wherein the second growth core is formed by increasing number of colored very fine pixels of another single cluster.

3. The gradation display method according to claim 2,
wherein the image is formed on a surface of a charged photosensitive drum;
wherein in the forming step, the very fine pixels are irradiated with a light beam; and
wherein in the coloring step, the electrostatic latent image is developed to form a toner image.

4. The gradation display method according to claim 2, wherein a dimension of the first growth core is always different from that of the second growth core.

5. The gradation display method according to claim 2,
wherein in a lower gradation level, the colored very fine pixel is formed of only the first growth core, which is formed by increasing the number of the colored very fine pixels of the single cluster; and
wherein in an intermediate gradation level to a higher gradation level, the colored very fine pixel is formed of only the second growth core, which is formed by increasing the number of the colored very fine pixels of the another single cluster.

6. The gradation display method according to claim 2,
wherein in a lower gradation level, the colored very fine pixel is formed of only the first growth core, which is formed by increasing the number of the colored very fine pixels of the single cluster; and
wherein in an intermediate gradation level to a higher gradation level, the colored very fine pixel is formed of the first growth core and the second growth core, which is formed by increasing the number of the colored very fine pixels of the another single cluster.

7. The gradation display method according to claim 2,
wherein in a low gradation level, a first-growth-core-displaying electrostatic latent image capable of coloring the first growth core is grown and a second-growth-core-displaying electrostatic latent image is grown so that the second growth core is not colored; and wherein in an intermediate gradation level to a higher gradation level, the second-growth-core-displaying electrostatic latent image is grown so that the second growth core is colored.

8. The gradation display method according to claim 2, further comprising the steps of:
dividing area of one very fine pixel by n; and
coloring each of divided areas to display the one very fine pixel in a multiple-values manner,
wherein n is a positive integer.

9. The gradation display method according to claim 1, wherein a dimension of the first growth core is always different from that of the second growth core.

10. The gradation display method according to claim 9, wherein the dimension of the second growth core is always smaller than that of the first growth core.

11. The gradation display method according to claim 1,
wherein in a lower gradation level, the dimension of the second growth core is always no larger than that of the first growth core; and
wherein in an intermediate gradation level and a higher gradation level, the dimension of the second growth core is always larger than that of the first growth core.

12. The gradation display method according to claim 1,
wherein the first growth core is first growth cores; and
wherein the second growth core is located near a center between the first growth cores.

13. The gradation display method according to claim 1,
wherein in a lower gradation level, the colored very fine pixel is formed of only the first growth core, which is formed by increasing the number of the colored very fine pixels of the single cluster; and
wherein in an intermediate gradation level to a higher gradation level, the colored very fine pixel is formed of the first growth core and the second growth core, which is formed by increasing the number of the colored very fine pixels of the another single cluster.

14. The gradation display method according to claim 1,
wherein both the first growth core and the second growth core are grown in an intermediate gradation level to a higher gradation level.

15. The gradation display method according to claim 13
wherein the first growth core and the second growth core are alternately grown in the intermediate gradation level to the higher gradation level.

16. The gradation display method according to claim 1,
wherein in a lower gradation level, only the first growth core is grown; and
wherein in an intermediate gradation level to a higher gradation level, only the second growth core is grown.

17. A gradation display method for displaying a color image, the method comprising the steps of:
dividing an image into a plurality of pixels having fine areas;
dividing each of fine pixels into very fine pixels having very fine areas; and
displaying gradation based on a ratio of area of colored very fine pixels to that of all very fine pixels within each of pixels,
wherein the colored very fine pixel formed of a first growth core and a second growth core;
wherein the first growth core is formed by increasing number of colored very fine pixels of a single cluster; and
wherein the second growth core is formed by increasing number of colored very fine pixels of another single cluster.

18. An image forming apparatus comprising:
an image processing unit for processing image data;
an exposure unit for emitting a light beam based on the processed image data inputted from the image processing unit;
a photosensitive drum on which the light beam is irradiated to form an electrostatic latent image;
a charging unit for charging the photosensitive drum;
a developing unit for developing the electrostatic latent image with a developer; and
a transfer unit for transferring the developed electrostatic latent image onto a recording medium,
wherein the image processing unit divides an image contained in the image data into a plurality of pixels having fine areas;
wherein the image processing unit divides each of fine pixels into very fine pixels having very fine areas; and
wherein the image processing unit processes the image data so that gradation is displayed based on a ratio of area of colored very fine pixels to that of all very fine pixels within each of pixels,
wherein the colored very fine pixel formed of a first growth core and a second growth core;
wherein the first growth core is formed by increasing number of colored very fine pixels of a single cluster; and
wherein the second growth core is formed by increasing number of colored very fine pixels of another single cluster.

* * * * *